US012732778B2

(12) United States Patent
Lee et al.

(10) Patent No.: US 12,732,778 B2
(45) Date of Patent: Sep. 8, 2026

(54) LOCATING METHOD USING ADVERTISEMENT AND ELECTRONIC DEVICE THEREFOR

(71) Applicant: SAMSUNG ELECTRONICS CO., LTD., Suwon-si (KR)

(72) Inventors: Jubyung Lee, Suwon-si (KR); Doosuk Kang, Suwon-si (KR); Sangchul Yun, Suwon-si (KR); Gyujin Lee, Suwon-si (KR); Wonkyoung Jang, Suwon-si (KR); Junwan Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 305 days.

(21) Appl. No.: 18/384,274

(22) Filed: Oct. 26, 2023

(65) Prior Publication Data

US 2024/0056773 A1 Feb. 15, 2024

Related U.S. Application Data

(63) Continuation of application No. PCT/KR2022/004845, filed on Apr. 5, 2022.

(30) Foreign Application Priority Data

Apr. 27, 2021 (KR) ........................ 10-2021-0054470

(51) Int. Cl.
*H04W 4/02* (2018.01)
*H04L 51/222* (2022.01)
(Continued)

(52) U.S. Cl.
CPC .......... *H04W 4/029* (2018.02); *H04L 51/222* (2022.05)

(58) Field of Classification Search
CPC ......... H04W 4/80; H04W 4/06; H04W 4/029; H04W 4/023; H04W 8/24; H04W 88/02; H04L 51/222; Y02D 30/70
See application file for complete search history.

(56) References Cited

U.S. PATENT DOCUMENTS 9,786,153 B2 10/2017 London
10,057,720 B2 8/2018 Tang et al.
(Continued)

FOREIGN PATENT DOCUMENTS

CN 110505347 A 11/2019
CN 110972059 A 4/2020
(Continued)

OTHER PUBLICATIONS

Communication dated Oct. 1, 2025 issued by the Korean Intellectual Property Office in Korean Patent Application No. 10-2021-0054470.

(Continued)

*Primary Examiner* — Khawar Iqbal
(74) *Attorney, Agent, or Firm* — Sughrue Mion, PLLC

(57) ABSTRACT

Disclosed are methods and electronic devices configured to transmit, at a first period, a first-type advertisement (ADV) packet to a first external electronic device using the wireless communication circuit; determine that the electronic device is missing based on location information of the electronic device if a first response signal for the first-type ADV packet is not received from the first external electronic device; in response to determining that the electronic device is missing, transmit, at a second period, a second-type ADV packet to a nearby external electronic device using the wireless communication circuit; receive a second response signal for the second-type ADV packet from a second external electronic device; and transmit, to the second external electronic (Continued)

device, a signal including information of the electronic device based on reception of the second response signal.

17 Claims, 15 Drawing Sheets

(51) Int. Cl.
*H04W 4/029* (2018.01)
*H04W 8/24* (2009.01)

(56) References Cited

U.S. PATENT DOCUMENTS

| | | | | |
|---|---|---|---|---|
| 10,410,506 | B2 | 9/2019 | London | |
| 10,667,313 | B2 * | 5/2020 | Maguire | H04W 12/63 |
| 10,938,963 | B2 | 3/2021 | Joo et al. | |
| 11,019,567 | B2 | 5/2021 | Foster et al. | |
| 11,069,219 | B2 | 7/2021 | London | |
| 11,138,844 | B2 | 10/2021 | Kim et al. | |
| 11,290,888 | B2 | 3/2022 | Lee et al. | |
| 11,308,789 | B2 | 4/2022 | Baek et al. | |
| 11,638,212 | B2 | 4/2023 | Foster et al. | |
| 11,995,966 | B2 * | 5/2024 | Shakedd | G06K 7/10297 |
| 12,279,205 | B2 * | 4/2025 | Foster | H04W 52/0225 |
| 2007/0282716 | A1 * | 12/2007 | Branigan | G06Q 10/0875 705/28 |
| 2016/0127862 | A1 | 5/2016 | Beattie, Jr. | |
| 2016/0240067 | A1 | 8/2016 | London | |
| 2017/0006425 | A1 | 1/2017 | Tang et al. | |
| 2017/0078837 | A1 | 3/2017 | Liang et al. | |
| 2017/0180927 | A1 | 6/2017 | Ding et al. | |
| 2018/0096585 | A1 | 4/2018 | London | |
| 2019/0020735 | A1 | 1/2019 | Joo et al. | |
| 2020/0065531 | A1 * | 2/2020 | Ellis | G06K 17/0022 |
| 2020/0126394 | A1 | 4/2020 | London | |
| 2020/0265288 | A1 * | 8/2020 | Volkerink | H04W 4/33 |
| 2020/0272221 | A1 | 8/2020 | Foster et al. | |
| 2021/0264620 | A1 * | 8/2021 | Ramasamy | G06T 7/246 |
| 2021/0289319 | A1 * | 9/2021 | Antony | H04W 4/023 |
| 2022/0086735 | A1 * | 3/2022 | Zhang | H04W 12/50 |
| 2022/0277639 | A1 * | 9/2022 | Vishnoi | G08B 21/245 |
| 2022/0301410 | A1 * | 9/2022 | Erdmann, IV | G08B 21/24 |
| 2023/0209469 | A1 | 6/2023 | Foster et al. | |
| 2025/0247788 | A1 * | 7/2025 | Foster | H04W 52/0235 |
| 2025/0343680 | A1 * | 11/2025 | Lalande | H04W 4/029 |

FOREIGN PATENT DOCUMENTS

| | | | | |
|---|---|---|---|---|
| EP | 3989612 | B1 * | 1/2026 | H04W 88/02 |
| JP | 2019-110416 | A | 7/2019 | |
| KR | 10-2006-0092020 | A | 8/2006 | |
| KR | 10-2006-0101964 | A | 9/2006 | |
| KR | 10-2010-0030917 | A | 3/2010 | |
| KR | 10-2015-0120189 | A | 10/2015 | |
| KR | 10-2016-0047181 | A | 5/2016 | |
| KR | 10-2016-0050633 | A | 5/2016 | |
| KR | 10-2016-0149393 | A | 12/2016 | |
| KR | 10-1702496 | B1 | 2/2017 | |
| KR | 10 2017 0043098 | A | 4/2017 | |
| KR | 10-1813414 | B1 | 12/2017 | |
| KR | 10-1875377 | B1 | 7/2018 | |
| KR | 10-1887944 | B1 | 8/2018 | |
| KR | 10-1903696 | B1 | 10/2018 | |
| KR | 10-2019-0007769 | A | 1/2019 | |
| KR | 10-2019-0106862 | A | 9/2019 | |
| KR | 10-2019-0136934 | A | 12/2019 | |
| KR | 10-2020-0137302 | A | 12/2020 | |
| KR | 10-2020-0144759 | A | 12/2020 | |

OTHER PUBLICATIONS

Communication issued on Mar. 3, 2026 by the Korean Ministry of Intellectual Property (MOIP) in Korean Patent Application No. 10-2021-0054470.

* cited by examiner

600

| Adv Mode | Event Type | Common Extended Advertising Payload Format fields | | | | | | | |
|---|---|---|---|---|---|---|---|---|---|
| | | AdvA | TargetA | ADI | Aux Ptr | Sync Info | Tx Power | ACAD | Adv Data |
| 00b | Non-Connectable and Non-Scannable Undirected | C4 | X | M | O | O | O | O | O |
| 00b | Non-Connectable and Non-Scannable Ditected | C4 | C2 | M | O | O | O | O | O |
| 01b | Connectable Undirected | M | X | M | X | X | O | O | O |
| 01b | Connectable Ditected | M | M | M | X | X | O | O | O |
| 10b | Scannable Undirected | M | X | M | X | X | O | O | X |
| 10b | Scannable Ditected | M | M | M | X | X | O | O | X |
| 11b | RFU | | | | | | | | |

| | | Common Extended Advertising Payload Format fields | | | | | | | | |
|---|---|---|---|---|---|---|---|---|---|---|
| Event Type | Adv Mode | AdvA | TargetA | CTE Info | ADI | Aux Ptr | Sync Info | Tx Power | ACAD | Adv Data |
| Non-Connectable and Non-Scannable Ditected without auxiliary packet | 0b00 | M | M | X | X | X | X | O | X | X |
| Non-Connectable and Non-Scannable Ditected with auxiliary packet | 0b00 | C1 | C1 | X | M | M | X | C1 | X | X |
| Connectable Undirected | 0b01 | X | X | X | M | M | X | C1 | X | X |
| Connectable Ditected | 0b01 | X | X | X | M | M | X | C1 | X | X |
| Scannable Undirected | 0b10 | X | X | X | M | M | X | C1 | X | X |
| Scannable Ditected | 0b10 | X | X | X | M | M | X | C1 | X | X |
| RFU | 0b11 | | | | | | | | | |

FIG.10

LOCATING METHOD USING ADVERTISEMENT AND ELECTRONIC DEVICE THEREFOR

CROSS-REFERENCE TO RELATED APPLICATIONS

This application claims priority to International Application No. PCT/KR2022/004845, filed on Apr. 5, 2022, with the Korean Intellectual Property Office, which claims priority to Korean Patent Application No. 10-2021-0054470, filed on Apr. 27, 2021, in the Korean Intellectual Property Office, the disclosures of which are incorporated herein in their entireties.

TECHNICAL FIELD

Various embodiments of the disclosure relate to a locating method using advertisement (ADV) and an electronic device therefor.

BACKGROUND

Various devices are used to track the location of a person or object. The location of a person or object associated with a tracker may be tracked using an electronic device such as a tracker or a mobile phone. For example, an electronic device may be configured to obtain location information of the electronic device using a global positioning system (GPS) and transmit the obtained location information to a specified server. In this case, the electronic device may include a positioning circuit for obtaining the location information of the electronic device and a circuit that supports wireless communication for Internet access. Therefore, the size and power consumption of the electronic device may be increased.

An electronic device having a relatively small size, such as an earbud, may not include a positioning circuit or an Internet access function. The electronic device may be a relatively small device that supports short-range wireless communication. For example, the electronic device may be a small electronic device that may be attached to an object or carried by a person. For example, the electronic device may be attached to a keychain or inserted into a wallet or a pocket.

In order to track the location of an electronic device, a method for tracking the location of an electronic device using a companion device of the electronic device may be used. For example, in order to track an electronic device such as an earbud, a mobile phone associated with the electronic device may be used as a companion device. The electronic device may communicate using short-range wireless communication. While the electronic device and the companion device are connected to each other, the electronic device may be assumed to be in a state of being adjacent to the companion device.

When disconnected from the companion device, the electronic device may be assumed to be missing or in a missing state. The electronic device may broadcast information about the electronic device so as to allow nearby devices to report location information to a server. For example, the nearby devices may report, to the server, received information about the electronic device together with own location information. The server may identify the location of the electronic device based on the received location information of the nearby devices, and transfer the identified location of the electronic device to the companion device.

SUMMARY

An electronic device according to an embodiment of the disclosure may include: a wireless communication circuit configured to perform short-range wireless communication; a processor; and a memory, wherein the memory stores instructions that, when executed by the processor, cause the processor to: transmit, at a first period, a first-type advertisement (ADV) packet to a first external electronic device using the wireless communication circuit, wherein the first-type ADV packet is transmitted to request a response from the first electronic device, determine that the electronic device is missing based on location information of the electronic device if a first response signal for the first-type ADV packet is not received from the first external electronic device, in response to determining that the electronic device is missing, transmit, at a second period, a second-type ADV packet to a nearby external electronic device using the wireless communication circuit, wherein the second-type ADV is transmitted to request a response from the nearby external electronic device, receive a second response signal for the second-type ADV packet from a second external electronic device, and transmit, to the second external electronic device, a signal including information of the electronic device based on reception of the second response signal.

A method for transmitting electronic device information in a missing state of an electronic device according to an embodiment of the disclosure may include: transmitting, at a first period, a first-type advertisement (ADV) packet to a first external electronic device requesting a response from the first external electronic device; determine that the electronic device is missing based on location information of the electronic device if a first response signal for the first-type ADV packet is not received from the first external electronic device; in response to determining that the electronic device is missing, transmit, at a second period, a second-type ADV packet to a nearby external electronic device; receive a second response signal for the second-type ADV packet from a second external electronic device; and transmit, to the second external electronic device, a signal including information of the electronic device based on reception of the second response signal.

An electronic device according to an embodiment of the disclosure may include: a wireless communication circuit configured to perform Bluetooth communication; a processor; and a memory, wherein the memory stores instructions that, when executed by the processor, cause the electronic device to transmit, at a first period, a first-type advertisement (ADV) packet to a first external electronic device using the wireless communication circuit, wherein the first-type ADV packet is transmitted to request a response from the first electronic device, determine that the electronic device is missing based on location information of the electronic device if a first response signal for the first-type ADV packet is not received from the first external electronic device, in response to determining that the electronic device is missing, transmit, at a second period, a second-type ADV packet to a nearby external electronic device using the wireless communication circuit, wherein the second-type ADV is transmitted to request a response from the nearby external electronic device, receive a second response signal for the second-type ADV packet from a second external electronic device, and transmit, to the second external electronic device, a signal including information of the electronic device based on reception of the second response signal.

BRIEF DESCRIPTION OF THE DRAWINGS

FIG. 6 illustrates an exemplary table showing a payload format field of extended advertising of an indirect auxiliary advertisement (AUX_ADV_IND) protocol data unit (PDU).

FIG. 10 illustrates an exemplary table showing a payload format field of extended advertising of an indirect extended advertisement (ADV_EXT_IND) PDU.

With respect to the description of the drawings, the same or similar reference signs may be used for the same or similar elements.

DETAILED DISCLOSURE

When an electronic device is missing (also referred to as the electronic device being in a missing state herein), the electronic device may continuously consume current in order to broadcast (e.g., advertise) information about the electronic device. If the electronic device has relatively low battery capacity, the electronic device may be completely discharged before connecting to a companion device. In this case, the probability that the owner of the companion device will find the electronic device may decrease.

Furthermore, a nearby device (e.g., helper device) that has received the information about the electronic device may consume current in order to upload the information about the electronic device and to obtain own location information of the nearby device.

Furthermore, a server may receive, from a plurality of nearby devices, the information about the electronic device and the location information of the nearby devices. For example, information received from the plurality of nearby devices may be substantially the same information. Accordingly, load on the server may increase. Furthermore, an increase in the server load may cause an increase in cost such as the cost for securing an additional server for providing smooth service.

Various embodiments disclosed in the disclosure may provide an electronic device and a method for resolving the above-described problems.

As explained in more detail below, an electronic device according to an embodiment of the disclosure may reduce current consumption by controlling advertisement (ADV) operation in a missing state. The electronic device according to an embodiment of the disclosure may also reduce current consumption due to frequent upload from nearby devices by performing ADV based on a specified condition. The electronic device according to an embodiment of the disclosure may reduce the number of times of upload from nearby devices and server load by performing ADV based on a specified condition.

Hereinafter, various embodiments of the invention will be described with reference to the accompanying drawings. However, it should be understood that the invention is not limited to specific embodiments, but rather includes various modifications, equivalents and/or alternatives of various embodiments of the invention.

Figure 1:
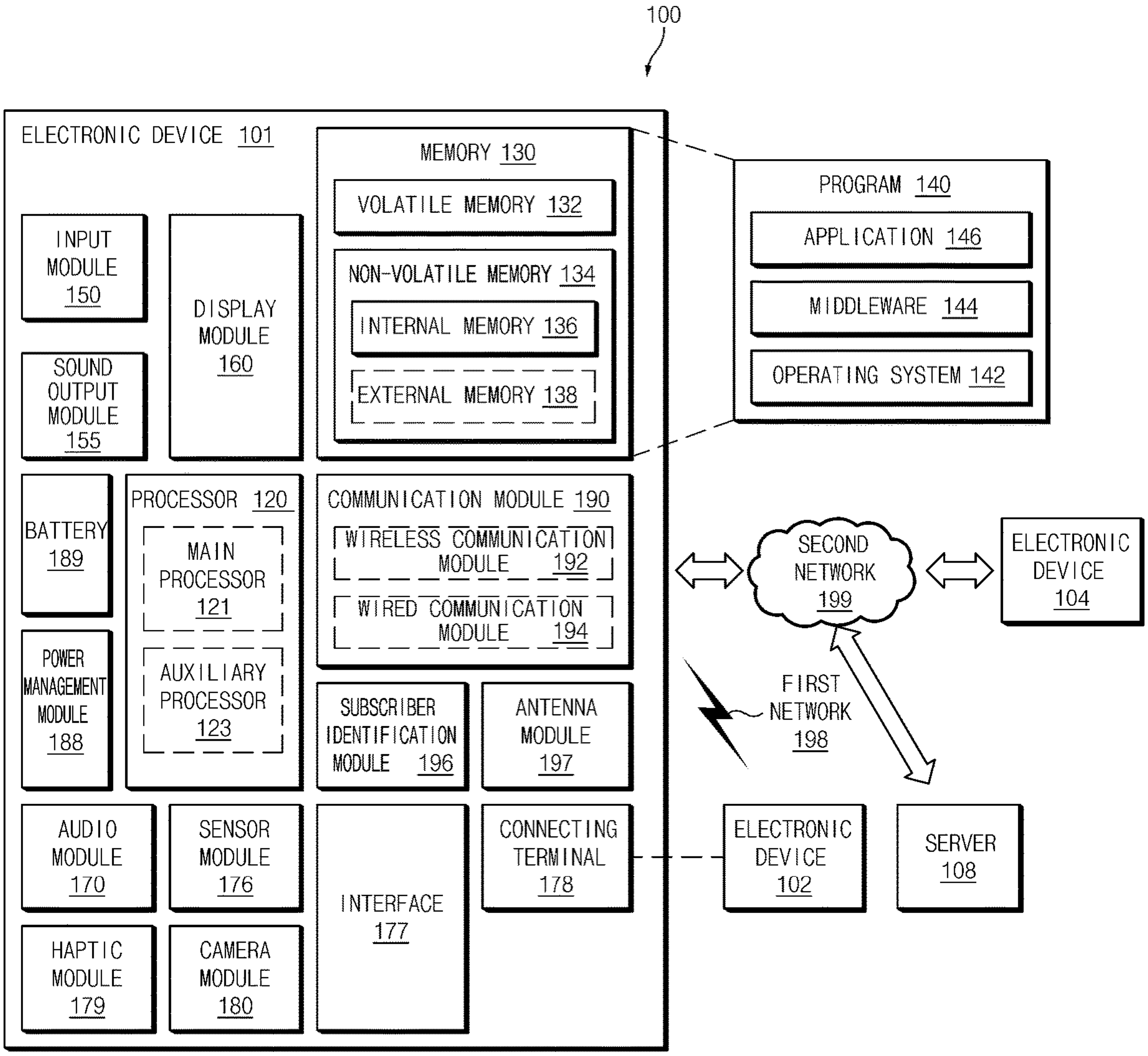
FIG. 1 is an exemplary block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
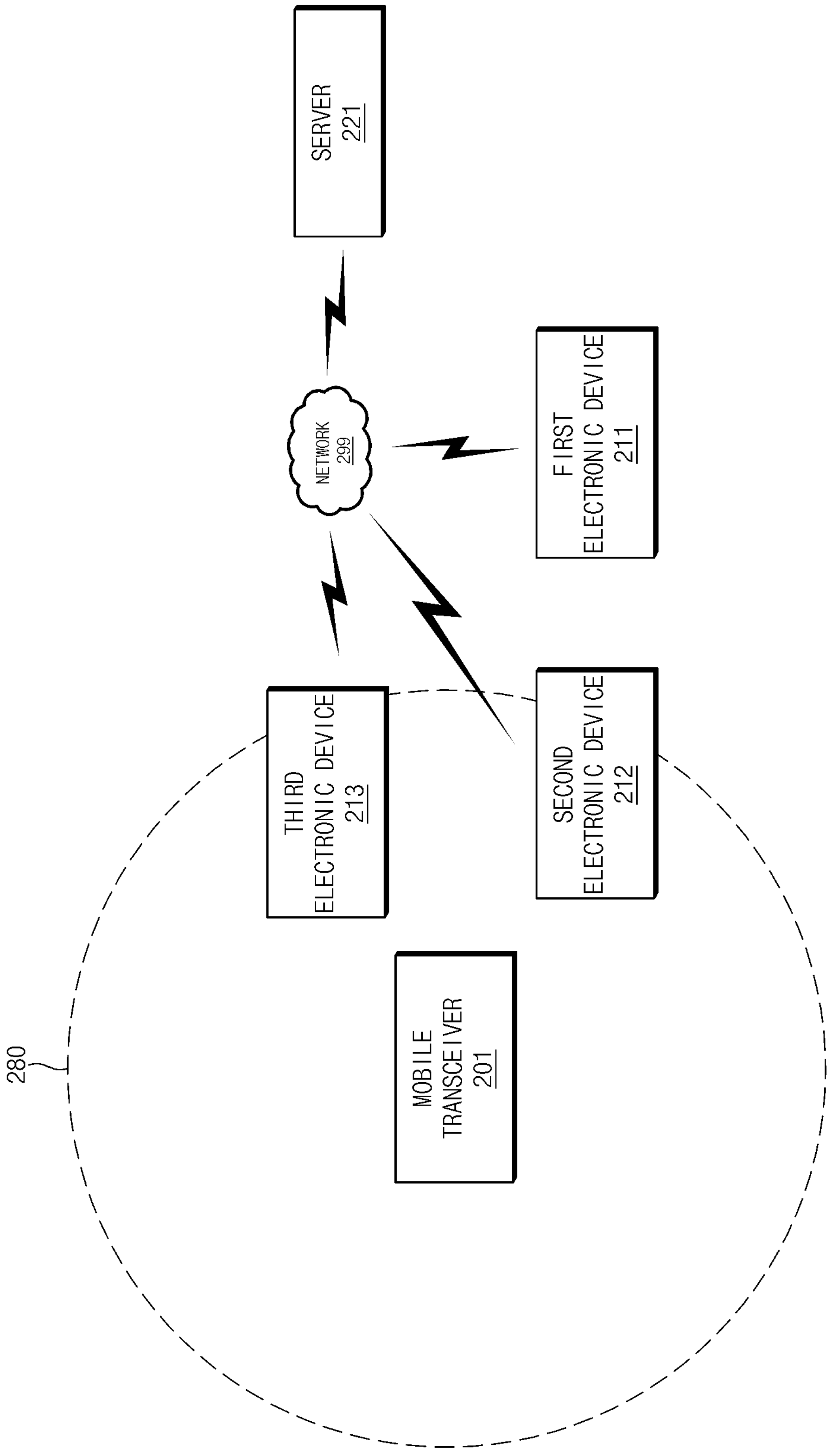
FIG. 2 illustrates a missing environment of a mobile transceiver according to an example.

FIG. 2 illustrates a missing environment of a mobile transceiver according to an example.

Operations according to embodiments of the disclosure will be broadly described with reference to FIG. 2. A mobile transceiver 201, a first electronic device 211, a second electronic device 212, and a third electronic device 213 each may be an electronic device including components similar to those of the electronic device 101 of FIG. 1. The mobile transceiver 201 may be an electronic device that supports short-range wireless communication (e.g., Bluetooth (e.g., Bluetooth legacy and/or Bluetooth low energy (BLE)), neighbor awareness network (NAN), Wi-Fi direct, and/or ultrawide band (UWB)). For example, the mobile transceiver 201 may be a tracker, an earbud, a camera, a smart watch, or a stylus. The first electronic device 211, the second electronic device 212, and the third electronic device 213 each may be an electronic device that supports short-range wireless communication and wireless communication for Internet access (e.g., cellular communication and/or WLAN). For example, the first electronic device 211, the second electronic device 212, and the third electronic device 213 each may be a mobile phone, user device, or any portable terminal. The first electronic device 211, the second electronic device 212, and the third electronic device 213 each may communicate with a server 221 via a network 299 (e.g., the second network 199 of FIG. 1).

In the example of FIG. 2, the mobile transceiver 201 may be a device associated with the first electronic device 211. For example, the mobile transceiver 201 may be an electronic device owned by a user of the first electronic device 211. The mobile transceiver 201 may be an electronic device paired with the first electronic device 211. The mobile transceiver 201 may be a device configured to transmit/receive data to/from the first electronic device 211 through short-range wireless communication.

For example, when the mobile transceiver 201 moves away from the first electronic device 211, the first electronic device 211 may be positioned outside short-range wireless communication coverage 280 of the mobile transceiver 201. Due to the first electronic device 211 being positioned outside the coverage 280, the mobile transceiver 201 may be unable to communicate with the first electronic device 211. According to an embodiment, the mobile transceiver 201 may determine a missing state of the mobile transceiver 201 based on a failure of reception of a signal from the first electronic device 211 and location information of the mobile transceiver 201. A method for determining the missing state of the mobile transceiver 201 will be described later in relation to FIGS. 3 to 15.

The mobile transceiver 201, in the missing state, may broadcast (e.g., advertise) information of the mobile transceiver 201 to nearby devices (e.g., the second electronic device 212 and the third electronic device 213) using short-range wireless communication. For example, the second electronic device 212 and the third electronic device 213 that have received a signal from the mobile transceiver 201 may transmit a response signal to the mobile transceiver 201. According to an embodiment, the mobile transceiver 201 may select a reliable external electronic device based on the response signals. A method for the mobile transceiver 201 to select a reliable external electronic device will be described later in relation to FIGS. 3 to 15.

In the example of FIG. 2, the mobile transceiver 201 may determine the second electronic device 212 as a reliable external electronic device. According to an embodiment, the mobile transceiver 201 may transmit information of the mobile transceiver 201 to the second electronic device 212. The second electronic device 212 may transfer, to the sever 221, the received information of the mobile transceiver 201 and location information of the second electronic device 212. An information transmission method of the mobile transceiver 201 will be described later in relation to FIGS. 3 to 15.

According to an embodiment, the server 221 may transmit, to the first electronic device 211, the received location information of the second electronic device 212 as a location of the mobile transceiver 201. For example, the server 221 may identify the first electronic device 211 linked to the mobile transceiver 201 using information (e.g., identification information of the mobile transceiver 201) received from the second electronic device 212. The server 221 may have a database storing information about at least one electronic device associated with the first electronic device 211. The server 221 may identify the first electronic device 211 by searching the database using the identification information of the mobile transceiver 201. The server 221 may transmit the location information of the second electronic device 212 and the information of the mobile transceiver 201 to the first electronic device 211.

The first electronic device 211 may provide the location of the mobile transceiver 201 to the user, using information received from the server 221. For example, the first electronic device 211 may display a user interface indicating the location of the mobile transceiver 201 based on received location information. The user of the first electronic device 211 may move to a location adjacent to the mobile transceiver 201 using the received location of the mobile transceiver 201.

After communication with the mobile transceiver 201 is disconnected, the first electronic device 211 may periodically transmit a signal for searching for the mobile transceiver 201. As the first electronic device 211 enters the coverage 280 of the mobile transceiver 201, the mobile transceiver 201 may receive a signal from the first electronic device 211. In response to receiving the signal, a connection between the mobile transceiver 201 and the first electronic device 211 may be restored. For example, the mobile transceiver 201 may provide a notification to the user by providing a visual, tactile, and/or auditory notification in response to reception of the signal from the first electronic device 211.

As described above in relation to FIG. 2, the mobile transceiver 201 may selectively cause at least one nearby device to upload information to the server 221 instead of causing all of the nearby devices to upload information to the server 221 immediately in response to missing of the mobile transceiver 201. Therefore, signal transmission for transferring information of the mobile transceiver 201 may reduce, signal transmission for uploading from nearby devices may reduce, and load on the server 221 may reduce. Hereinafter, embodiments of the disclosure will be described in more detail with reference to FIGS. 3 to 15.

Figure 3:
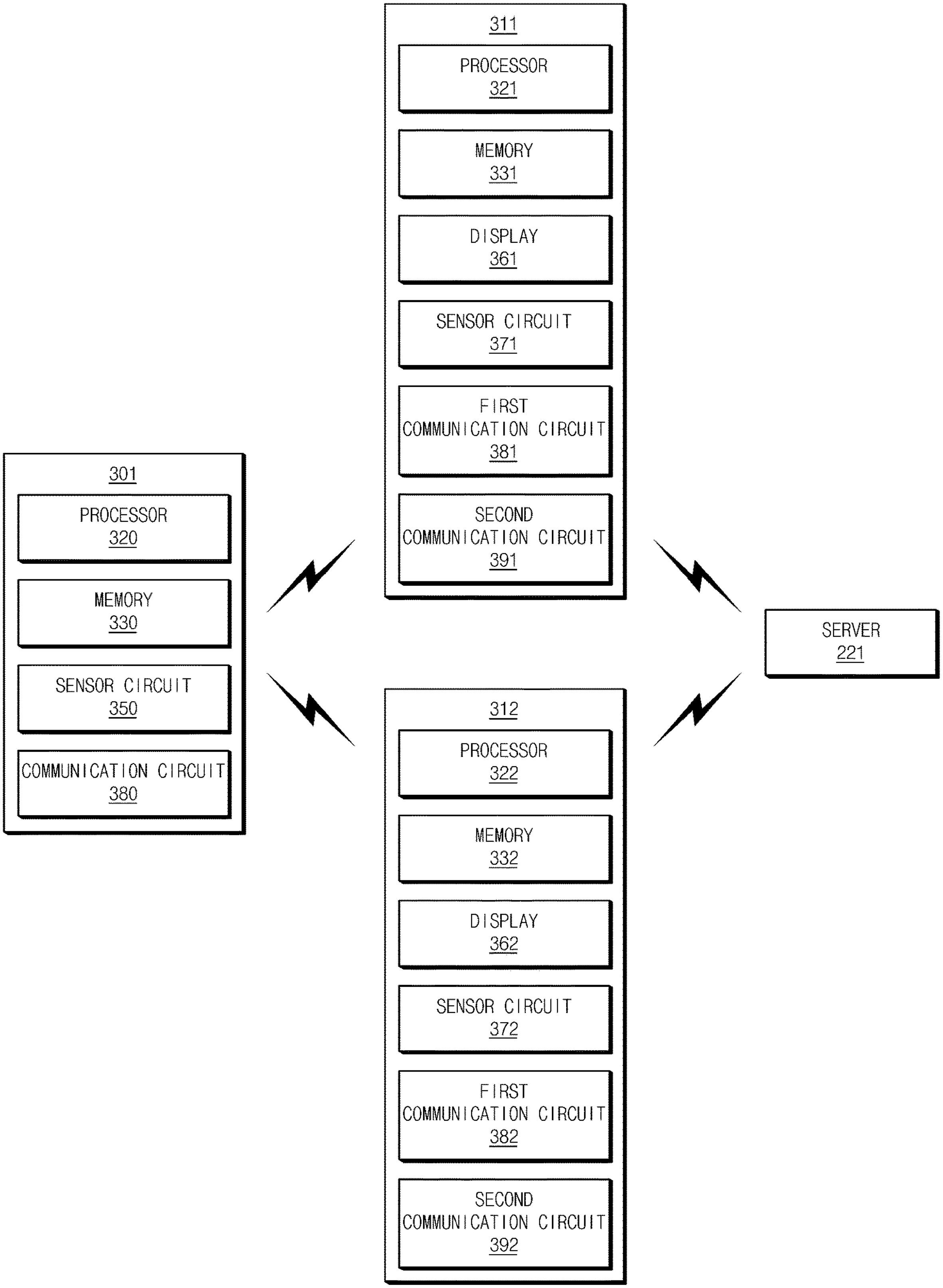
FIG. 3 illustrates an exemplary block diagram of electronic devices according to an embodiment.

FIG. 3 illustrates a block diagram of electronic devices according to an embodiment.

According to an example, an electronic device 301 (e.g., the mobile transceiver 201 of FIG. 2) may include a processor 320 (e.g., the processor 120 of FIG. 1), a memory 330 (e.g., the memory 130 of FIG. 1), a sensor circuit 350 (e.g., the sensor module 176 of FIG. 1), and/or a communication circuit 380 (e.g., the communication module 190 of FIG. 1). The processor 320 may be operatively connected to the memory 330, the sensor circuit 350, and the communication circuit 380. The memory 330 may store one or more instructions that, when executed, cause the processor 320 to perform various operations of the electronic device 301. The sensor circuit 350 may include at least one sensor (e.g., an accelerometer, geomagnetic sensor, inertial sensor, and/or gyroscope) capable of detecting motion information of the electronic device 301. The communication circuit 380 may be configured to support short-range wireless communication. For example, the communication circuit 380 may support Bluetooth (e.g., Bluetooth legacy and/or Bluetooth low energy (BLE)), neighbor awareness network (NAN), Wi-Fi direct, and/or ultra wide band (UWB) communication. The configuration of the electronic device 301 illustrated in FIG. 3 is exemplary, and embodiments of the disclosure are not limited thereto. The electronic device 301 may further include components not shown in FIG. 3 (e.g., at least one of the components of the electronic device 101 of FIG. 1). For example, the electronic device 301 may further include a battery and a housing.

According to an embodiment, a first external electronic device 311 (e.g., the first electronic device 211 of FIG. 2) may include a processor 321 (e.g., the processor 120 of FIG. 1), a display 361 (e.g., the display module 160 of FIG. 1), a memory 331 (e.g., the memory 130 of FIG. 1), a sensor circuit 371 (e.g., the sensor module 176 of FIG. 1), a first communication circuit 381 (e.g., the communication module 190 of FIG. 1), and a second communication circuit 391 (e.g., the communication module 190 of FIG. 1). The processor 321 may be operatively connected to the memory 331, the display 361, the sensor circuit 371, the first communication circuit 381, and the second communication circuit 391. The memory 331 may store one or more instructions that, when executed, cause the processor 321 to perform various operations of the first external electronic device 311. The sensor circuit 371 may include at least one module (e.g., a GPS module and/or GNSS module) capable of positioning the first external electronic device 311. The first communication circuit 381 may support short-range wireless communication (e.g., Bluetooth (Bluetooth legacy and/or Bluetooth low energy (BLE)), neighbor awareness network (NAN), Wi-Fi direct, and/or ultra wide band (UWB) communication). For example, the first external electronic device 311 may communicate with the electronic device 301 using the first communication circuit 381. The second communication circuit 391 may support wireless communication (e.g., cellular communication or WLAN communication) for communication with the server 221. The configuration of the first external electronic device 311 illustrated in FIG. 3 is exemplary, and embodiments of the disclosure are not limited thereto. The first external electronic device 311 may further include components not shown in FIG. 3 (e.g., at least one of the components of the electronic device 101 of FIG. 1).

According to an embodiment, a second external electronic device 312 (e.g., the second electronic device 212 of FIG. 2) may include a processor 322 (e.g., the processor 120 of FIG. 1), a display 362 (e.g., the display module 160 of FIG. 1), a memory 332 (e.g., the memory 130 of FIG. 1), a sensor circuit 372 (e.g., the sensor module 176 of FIG. 1), a first communication circuit 382 (e.g., the communication module 190 of FIG. 1), and a second communication circuit 392 (e.g., the communication module 190 of FIG. 1). The processor 322 may be operatively connected to the memory 332, the display 362, the sensor circuit 372, the first communication circuit 382, and the second communication circuit 392. The memory 332 may store one or more instructions that, when executed, cause the processor 322 to perform various operations of the second external electronic device 312. The sensor circuit 372 may include at least one module (e.g., a GPS module and/or GNSS module) capable of positioning the second external electronic device 312. The first communication circuit 382 may support short-range wireless communication (e.g., Bluetooth (Bluetooth legacy and/or Bluetooth low energy (BLE)), neighbor awareness network (NAN), Wi-Fi direct, and/or ultra wide band (UWB) communication). For example, the second external electronic device 312 may communicate with the electronic device 301 using the first communication circuit 382. The second communication circuit 392 may support wireless communication (e.g., cellular communication or WLAN communication) for communication with the server 221. The configuration of the second external electronic device 312 illustrated in FIG. 3 is exemplary, and embodiments of the disclosure are not limited thereto. The second external electronic device 312 may further include components not shown in FIG. 3 (e.g., at least one of the components of the electronic device 101 of FIG. 1).

Hereinafter, operations of the electronic device 301, the first external electronic device 311, and the second external electronic device 312 will be described with reference to the configurations of the electronic device 301, the first external electronic device 311, and the second external electronic device 312 described above in relation to FIG. 3. For example, operations of the electronic device 301 may be referred to as being performed by the processor 320, operations of the first external electronic device 311 may be referred to as being performed by the processor 321, and operations of the second external electronic device 312 may be referred to as being performed by the processor 322. As described above in relation to FIG. 2, the electronic device 301 may be referred to as a device associated with the first external electronic device 311. For example, the first external electronic device 311 may be referred to as a companion device of the electronic device 301. The second external electronic device 312 may be an electronic device located adjacent to the electronic device 301. The user of the first external electronic device 311 and a user of the second external electronic device 312 may be different from each other.

Figure 4:
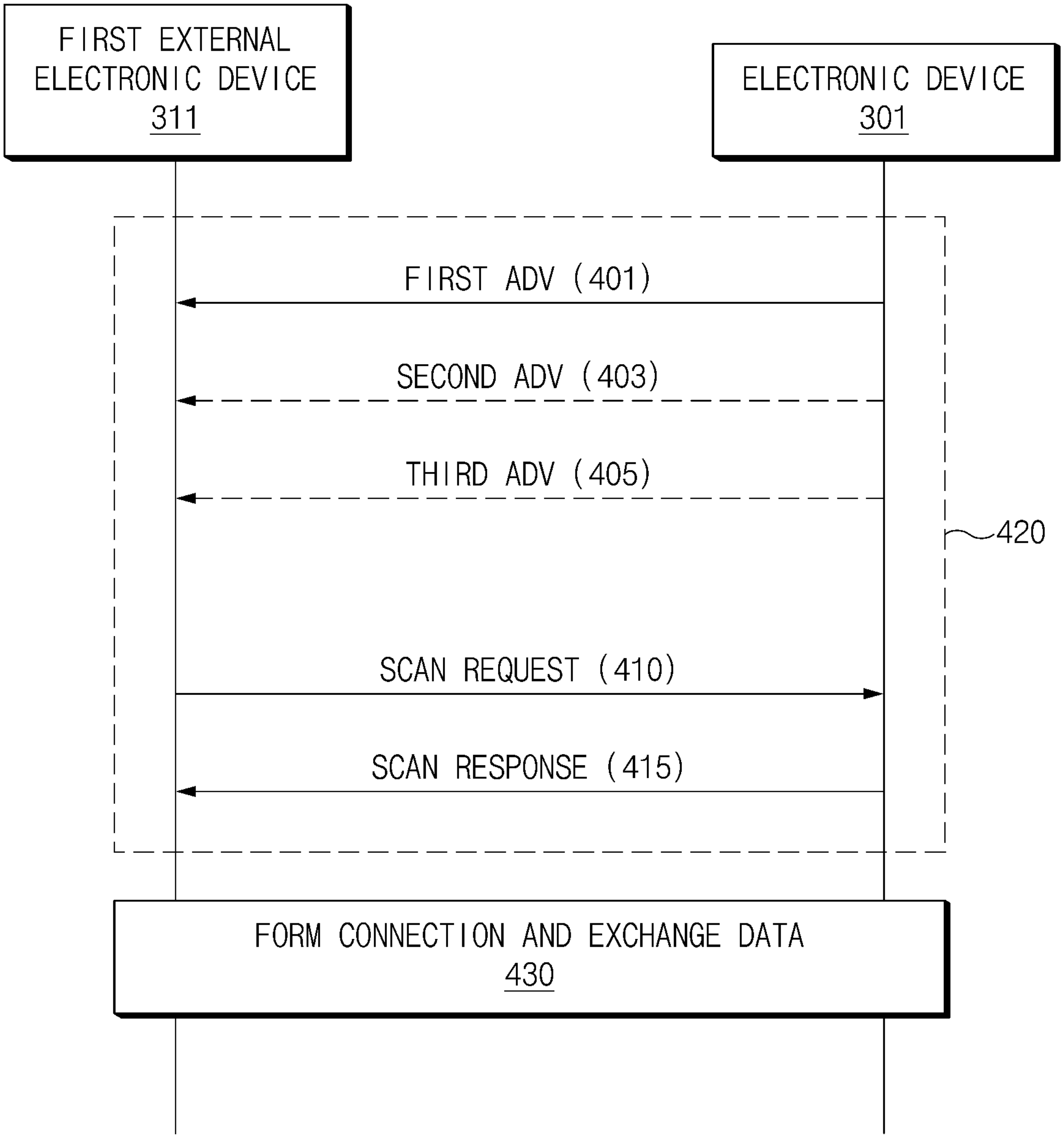
FIG. 4 illustrates an exemplary signal flow diagram of communication between an electronic device and a first external electronic device according to an embodiment.

FIG. 4 illustrates a signal flow diagram of communication between an electronic device and a first external electronic device according to an embodiment.

Referring to FIGS. 3 and 4, according to an embodiment, the electronic device 301 may be communicate with the first external electronic device 311. For example, the electronic device 301 may communicate with the first external electronic device 311 using the communication circuit 380. For convenience, the electronic device 301 may be assumed to communicate with the first external electronic device 311 based on Bluetooth (e.g., Bluetooth legacy and/or BLE) below. A core specification of Bluetooth special interest group (SIG) may be referenced in embodiments of the disclosure. The electronic device 301 may be assumed to be in a paired state with the first external electronic device 311.

In operation 401, the electronic device 301 may transmit a first ADV packet. For example, the electronic device 301 may transmit the first ADV packet through at least one of ADV channels (e.g., channel 37 (center frequency of 2402 MHz), channel 38 (center frequency of 2426 MHz), and channel 39 (center frequency of 2480 MHz)). In operation 403, the electronic device 301 may transmit a second ADV packet. In operation 405, the electronic device 301 may transmit a third ADV packet. For example, the electronic device 301 may transmit the second ADV packet a specified time period elapsed after transmitting the first ADV packet, and transmit the third ADV packet a specified time period elapsed after transmitting the second ADV packet. The first ADV packet and the second ADV packet may be transmitted through different ADV channels, and the second ADV packet and the third ADV packet may be transmitted through different channels.

For example, the electronic device 301 may transmit the first ADV packet, the second ADV packet, and/or the third ADV packet based on a situation of the electronic device 301. The electronic device 301 may transmit the second ADV packet in a second situation where a low search frequency is required. In a first situation where a higher search frequency than that of the second situation is required due to a nearby device, the electronic device 301 may transmit the first ADV packet. In this case, the electronic device 301 may transmit the first ADV packets through a plurality of channels (e.g., two of channels 37, 38, and 39). The electronic device 301 may transmit the third ADV packet in a third situation (e.g., emergency situation) where a higher search frequency than that of the first situation is required. In this case, the electronic device 301 may transmit the third ADV packet through all channels (e.g., channels 37, 38, and 39). The electronic device 301 may change an ADV channel map of channels through which an ADV packet will be transmitted by transferring an LE Set Extended Advertising Parameters command from a controller layer to a lower layer. Although transmission of an ADV packet through changed channels has been described in the above example, embodiments of the disclosure are not limited thereto. For example, the electronic device 301 may adjust a transmission period and/or transmission power of an ADV packet based on a situation of the electronic device 301. In a situation in which a high search frequency is required, the electronic device 301 may increase the transmission power and decrease the transmission period.

The first ADV packet, the second ADV packet, and the third ADV packet may be referred to as first-type data (e.g., first-type ADV packet). The first-type data may be data directed to a specified electronic device (e.g., the first external electronic device 211). The first-type data may be received by a specified electronic device. The first external electronic device 311 that has received the first-type data, for example, may transmit a response signal (e.g., scan request) in order to obtain additional information. A format of the first-type data will be described in detail in relation to FIGS. 5 and 6.

According to an embodiment, the electronic device 301 may transmit the first-type data in order to connect communication with the first external electronic device 311. For example, the electronic device 301 may be configured to transmit the first-type data at a first period. The electronic device 301 may transmit the first-type data when connecting to the first external electronic device 311 for the first time, when adjacent to the first external electronic device 311 previously connected, or when present at a specified location (e.g., reliable location such as home, office, or school). The electronic device 301 may transmit the first-type data to the first external electronic device 311 when the electronic device 301 is not in a missing state.

The first-type data may be received by a nearby device, but may be referred to as being broadcast to the first external electronic device 311. The electronic device 301 may include an address (e.g., Bluetooth address) of the first external electronic device 311 in the first-type data so as to direct the first-type data to the first external electronic device 311. For example, the electronic device 301 may include the address of the first external electronic device 311 in a peer address of the first-type data. By using the first-type data, the electronic device 301 may transmit connectionless data to the first external electronic device 311 without establishing a connection with the first external electronic device 311. In the example of FIG. 3, the first-type data may include the address of the first external electronic device 311 and a specified ADV handle value.

In operation 410, the first external electronic device 311 may transmit a scan request to the electronic device 301. For example, the first external electronic device 311 may perform scanning by setting a scan parameter to active scanning. The first external electronic device 311 may transmit the scan request to the electronic device 301 in response to reception of the first-type data from the electronic device 301. The first external electronic device 311 may include, in the scan request, the ADV handle value included in the received first-type data. By transmitting (e.g., broadcasting) the first-type data, the electronic device 301 may cause the first external electronic device 311 to transmit the scan request.

In operation 415, the electronic device 301 may transmit a scan response to the first external electronic device 311 in response to reception of the scan request. The electronic device 301 may form a connectionless link with the first external electronic device 311 through exchange of the scan request and the scan response. For example, the electronic device 301 and the first external electronic device 311 may exchange a limited amount of data through exchange of the scan request and the scan response. Operations 401 to 415 may be referred to as a connectionless link establishing operation (e.g., operation 420). In operation 420, the electronic device 301 and the first external electronic device 311 may be maintained in an advertising state. That is, the electronic device 301 may exchange data with the first external electronic device 311 without establishing a link such as a low energy (LE) link.

According to an embodiment, the electronic device 301 may form a connection link (e.g., LE connection) with the first external electronic device 311, and may transmit/receive data through the connection link. For example, in operation 430, the electronic device 301 may form a connection with the first external electronic device 311, and may exchange data through the formed connection. For example, the first external electronic device 311 may form a connection by transmitting a connection request to the electronic device 301. After exchanging data (e.g., operation 430), the electronic device 301 and the first external electronic device 311 may return to an advertising state.

In an example, the electronic device 301 may receive a key value (e.g., hash value) from the first external electronic device 311 through the formed connection. The electronic device 301 may transmit the first-type data including data encrypted (e.g., hash data) based on the received key value. For example, the electronic device 301 may include the encrypted data in upper 10 bytes of a payload (e.g., AdvData 524 of FIG. 5). For example, the electronic device 301 may generate the encrypted data using a specified encryption algorithm (e.g., advanced encryption standard (AES)-128). The first external electronic device 311 may identify that the electronic device 301 is a device linked to the first external electronic device 311 using the encrypted data.

According to an embodiment, the electronic device 301 may receive information associated with a location, time, and/or risk level from the first external electronic device 311 through a connection link. For example, the electronic device 301 may receive, from the first external electronic device 311, location information of the first external electronic device 311, time information obtained by the first external electronic device 311, and/or risk level information set by the first external electronic device 311.

The risk level, for example, may be information set by the first external electronic device 311, a user, or a manufacturer. The risk level may be a value or flag set based on a location of the first external electronic device 311. For example, the risk level may increase as the first external electronic device 311 becomes farther away from a specified location (e.g., home, school, and/or office). The risk level may be a value or flag set based on time. For example, the risk level may increase if a current time corresponds to a specified time. The risk level may include mapping information including risk level values for location and/or time. In this case, the electronic device 301 may identify the risk level using received mapping information, time information, and/or location information.

The first external electronic device 311 may set a reliable location (e.g., home, school, and/or office) as a specified location. If the number of visits to a particular location is at least a specified number, the first external electronic device 311 may set the location as a specified location.

According to an embodiment, the first external electronic device 311 may transmit the information associated with a time, location, and/or risk level to the electronic device 301 by establishing a connection link with the electronic device 301 based on a specified condition. For example, the specified condition may include a specified period. The first external electronic device 311 may form a connection link with the electronic device 301 at the specified period and exchange data. For example, the specified condition may include a specified location. If the first external electronic device 311 deviates from a reliable specified location (e.g., home, school, and/or office), the first external electronic device 311 may form a connection link with the electronic device 301 and exchange data.

According to an embodiment, the electronic device 301 may change an period (e.g., first period) for transmitting the first-type data based on a time, location, and/or risk level received from the first external electronic device 311. For example, if location information deviating from a specified location is received, the electronic device 301 may change the first period to a shorter period. For example, if the risk level increases, the electronic device 301 may change the first period to a shorter period. The first period is a period at which the electronic device 301 transmits the first-type data, and the electronic device 301 may be configured to transmit a plurality of ADV packets within one period. For example, the electronic device 301 may repeatedly transmit the first-type data at least one time. The first period may be referred to as an exchange period of the scan request and the scan response through transmission of the first-type data.

As described above in relation to FIG. 4, the electronic device 301 may identify that the first external electronic device 311 is adjacent to the electronic device 301 by performing operation 420 at the first period. The electronic device 301 may monitor a state of communication with the first external electronic device 311 by periodically exchanging data through a connectionless link. Furthermore, the electronic device 301 may receive additional data from the first external electronic device 311 by performing operation 430 based on the specified condition.

Figure 5:
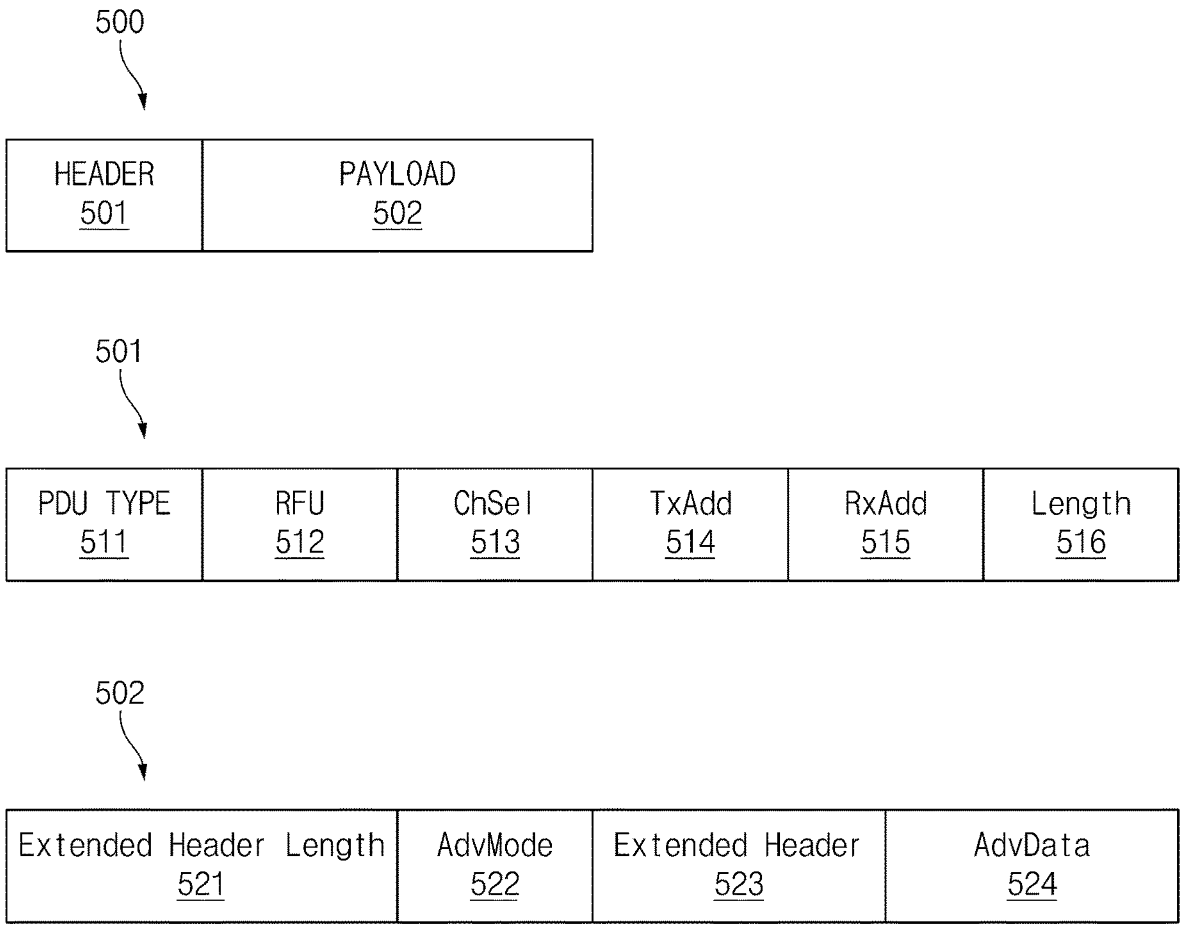
FIG. 5 illustrates an exemplary advertisement (ADV) packet structure according to an embodiment.

FIG. 5 illustrates an ADV packet structure according to an embodiment.

According to an embodiment, the first-type data (e.g., the first ADV packet, second ADV packet, or third ADV packet of FIG. 4) described above in relation to FIG. 4 may be referred to as an ADV packet 500. The ADV packet 500 may include a header 501 and a payload 502. The header 501 may have a length of 16 bits, and the payload 502 may have a length of 1 to 255 bytes. In some embodiments, the header 501 may have a length of between 16 to 256 bits.

The header 501 may include fields of a protocol data unit (PDU) type 511, reserved for future use (RFU) 512, ChSel 513, TxAdd 514, RxAdd 515, and Length 516. The PDU type 511 may have a length of 4 or more bits and indicate a PDU type of a corresponding ADV packet. For example, the PDU type 511 may have a value of 0b0000 in the case of an indirect type advertisement (ADV_IND), and may have a value of 0b0111 in the case of an indirect extended advertisement (ADV_EXT_IND) or indirect auxiliary advertisement (AUX_ADV_IND). The fields of the ChSel 513, TxAdd 514, and RxAdd 515 may have values specified in the PDU type. The field of Length 516 may indicate the number of bytes of the payload 502.

The structure of the payload 502 illustrated in FIG. 5 is an example of a common extended advertising payload format. The first-type data described above in relation to FIG. 4 may include AUX_ADV_IND PDU. For example, the electronic device 301 may include AUX_ADV_IND PDU of a Scannable Directed type in the first-type data. The field of Extended Header Length 521 may have a length of 6 bits, and may indicate a length of the field of Extended Header 523. The field of AdvMode 522 may have a length of 2 bits, and may indicate a mode of advertising. The field of Extended Header 523 may have a length of 0 to 63 bytes, and may include at least some of the fields described below in relation to FIG. 6. The field of AdvData 524 may have a length of 0 to 254 bytes. Hereinafter, the structure of the payload 502 of AUX_ADV_IND PDU will be described with reference to FIG. 6.

FIG. 6 illustrates a table 600 showing a payload format field of extended advertising of AUX_ADV_IND PDU.

Referring to FIGS. 5 and 6, the meanings of the values shown in table 600 are described as below. 'X' indicates that a corresponding field is not used (e.g., RFU). 'M' indicates that this field is mandatory. O indicates that this field is optional. 'C1' indicates that this field is optional on low energy (LE) 1M PHY and is RFU on LE Coded PHY. C2 indicates that this field is mandatory if a corresponding field is not present within ADV_EXT_IND PDU, and is RFU otherwise. 'C4' indicates that this field is optional if a corresponding field is not present within ADV_EXT_IND PDU, and is RFU otherwise.

If the electronic device 301 includes AUX_ADV_IND PDU of a Scannable Directed type in the first-type data, the fields of the payload 502 may be configured as shown in table 600. For AUX_IND_PDU of a Scannable Directed type, the value of the field of AdvMode 522 may be set to 0b10. The field of Extended Header 523 may mandatorily include AdvA, TargetA, and ADI fields, and may not include the fields of CTE info, AuxPtr, SyncInfo, and AdvData 524. The field of Extended Header 523 may optionally include TxPower and ACAD fields.

The AdvA field indicates an address of a device (e.g., the electronic device 301) performing advertising. If the value of the field of TxAdd 514 is 0, the value of the ADvA field indicates a public address of the electronic device 301. If the value of the field of TxAdd 514 is 1, the value of the ADvA field indicates a random address of the electronic device 301.

The TargetA field indicates an address of a target device (e.g., the first external electronic device 311). If the value of RxAdd 515 is 0, the TargetA field indicates a public address of a target device. If the value of RxAdd 515 is 1, the TargetA field indicates a random address of a target device.

The CTEInfo field indicates that a corresponding packet includes Constant Tone Extension.

The AdvDataInfo (ADI) field may include advertising (ADV) set identifier (SID) and ADV data ID (DID). The SID may be a value for a device (e.g., the electronic device 301) that transmits ADV to differentiate advertising of the device from other advertising set. The DID may indicate whether data of the field of AdvData 524 is the same as the data of a previously transmitted packet.

The AuxPtr field indicates that some data is present in a subsequent auxiliary packet.

The SyncInfo field may include information for synchronization.

The TxPower may include information about a transmission power level.

The additional controller advertising data (ACAD) field may include data from a control device of a device performing advertising or data to be used by a control device of a reception device.

In the case where the electronic device 301 transmits the first-type data, an address of the first external electronic device 311 may be included in the TargetA field so as to allow the first external electronic device 311 to receive the first-type data. Furthermore, for security purpose, the first external electronic device 311 may not determine that the electronic device 301 is a device of the first external electronic device 311 based only on the address in the TargetA field. For example, the external electronic device 311 may determine whether the electronic device 301 is a device associated with the first external electronic device 311 using information included in a payload (e.g., AdvData 524). When temporarily connected to the first external electronic device 311, the electronic device 301 may receive a key value (e.g., Hash Key) from the first external electronic device 311. In an example, the electronic device 301 may transmit an advertising packet (e.g., first-type data) including, in a payload, data encrypted (e.g., hash data) based on the received key value. The first external electronic device 311 may decrypt the encrypted data using a shared key (e.g., Hash Key) and check the decrypted data so as to identify that the electronic device 301 is a device linked to the first external electronic device 311. The first external electronic device 301 may provide improved security by identifying the electronic device 301 using the encrypted data.

Figure 7:
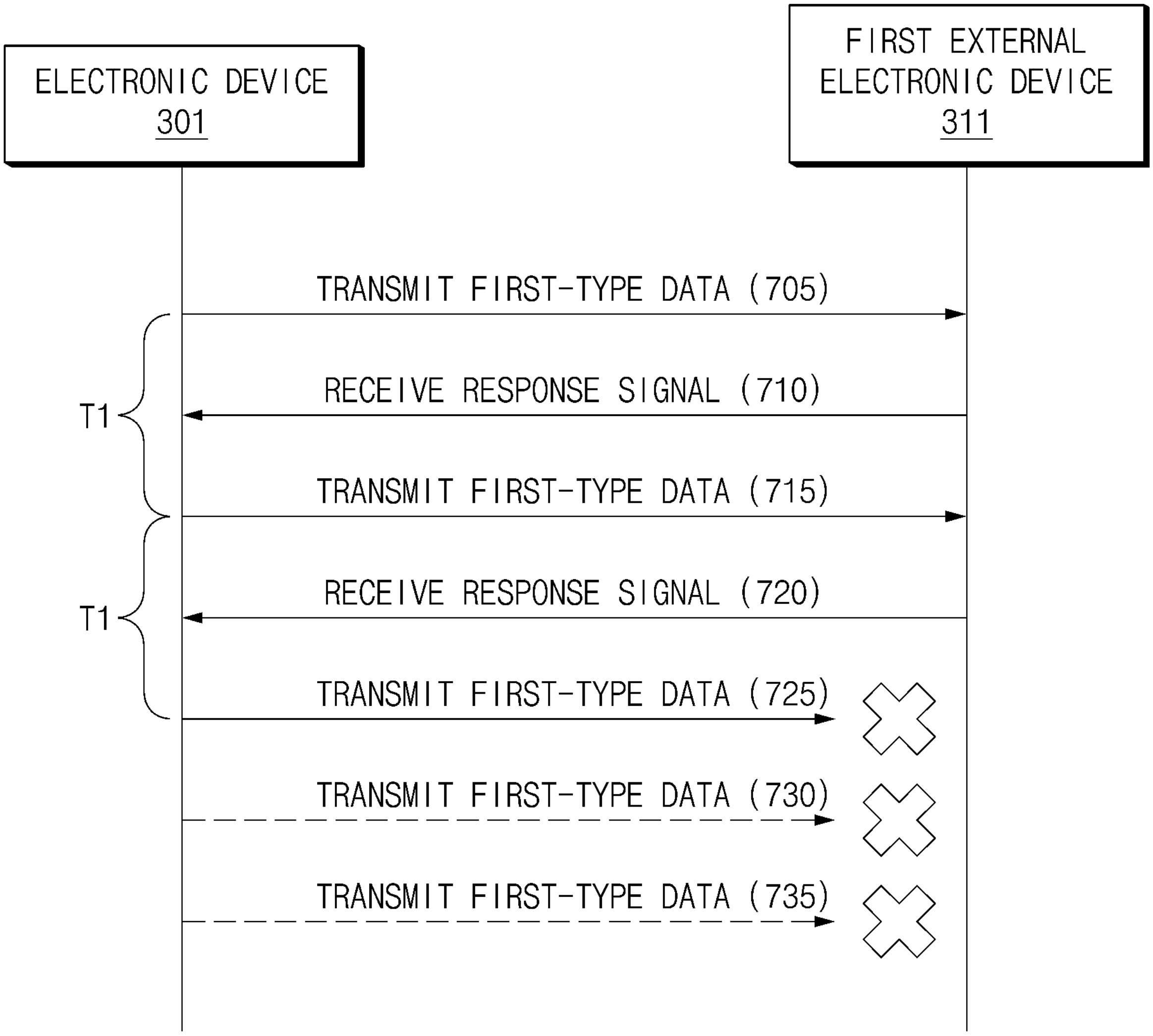
FIG. 7 illustrates an exemplary signal flow diagram of communication between an electronic device that is missing (e.g., in a missing state) and a first external electronic device according to an embodiment.

FIG. 7 illustrates a signal flow diagram of communication between an electronic device in a missing state and a first external electronic device according to an embodiment.

According to an embodiment, the electronic device 301 may transmit first-type data to the first external electronic device 311 at a specified first period Ti. In operation 705, the electronic device 301 may transmit the first-type data to the first external electronic device 311. For example, the electronic device 301 may transmit the first-type data to the first external electronic device 311 by performing at least one of operation 401, 403, or 405 of FIG. 4. The electronic device 301 may transmit the first-type data to the first external electronic device 311 through a connectionless link. However, in order to include encrypted data in the first-type data, the electronic device may temporarily form a connection link with the first external electronic device and share a key for data encryption and decryption. For example, the first-type data may include encrypted data even on a connectionless link based on a key value received from the first external electronic device 311.

The electronic device 301 may check whether the first external electronic device 311 is located adjacent to the electronic device 301 through transmission of the first-type data. In an example, the electronic device 301 may transmit specified data instead of the first-type data through a connection link with the first external electronic device 311. In this case, the electronic device 301 may periodically transmit the specified data after establishing a connection link with the first external electronic device 311, and may identify the presence of the first external electronic device 311 by receiving a response signal for the specified data.

In operation 710, the first external electronic device 311 may transmit a response signal in response to reception of the first-type data. For example, the response signal may correspond to the scan request of FIG. 4. In an example, the first external electronic device 311 may decrypt the encrypted data included in the first-type data using a key value shared with the electronic device 301, and may identify the electronic device 301 based on the decrypted data. If the electronic device 301 is identified as a device linked to the first external electronic device 311 based on the decrypted data, the first external electronic device 311 may transmit the response signal.

Although not illustrated in FIG. 7, the electronic device 301 may transmit a signal (e.g., the scan response of FIG. 4) corresponding to the response signal to the first external electronic device 311. The electronic device 301 may identify that the electronic device 301 is in a state of being adjacent (e.g., not in a missing state) to the first external electronic device 311 by receiving the response signal from the first external electronic device 311.

In operation 715, the electronic device 301 may transmit the first-type data to the first external electronic device 311. For example, the electronic device 301 may transmit the first-type data to the first external electronic device 311 by performing at least one of operation 401, 403, or 405 of FIG. 4. After performing operation 705, the electronic device 301 may perform operation 715 at the specified first period Ti.

In operation 720, the first external electronic device 311 may transmit a response signal in response to reception of the first-type data. For example, the response signal may correspond to the scan request of FIG. 4.

For example, the electronic device 301 may fail to receive the response signal from the first external electronic device 311 since the electronic device 301 is far away from the first external electronic device 311. In operations 725, 730, and 735, the electronic device 301 may transmit the first-type data, but may fail to receive the response signal from the first external electronic device 311. For example, the electronic device 301 may transmit the first-type data using all ADV channels (e.g., channels 37, 38, and 39) based on reception strength (e.g., received signal strength indicator (RSSI)) of the response signal from the first external electronic device 311. In operations 725, 730, and 735, the electronic device 301 may transmit the first-type data through different ADV channels.

According to an embodiment, the electronic device 301 may determine that a communication link with the first external electronic device 311 has been disconnected based on non-reception of the response signal for the first-type data. For example, if the response signal is not received from the first external electronic device 311 within a specified time after transmitting the first-type data, the electronic device 301 may determine that the communication link (e.g., connectionless link) has been disconnected. If the response signal is not received from the first external electronic device 311 after transmitting the first-type data for a specified number of times, the electronic device 301 may determine that the communication link has been disconnected.

According to an embodiment, the electronic device 301 may determine a state of the electronic device 301 as a missing state based on disconnection of the communication link with the first external electronic device 311. For example, if it is determined that the communication link with the first external electronic device 311 has been disconnected, the electronic device 301 may determine that the electronic device 301 is in a missing state. For another example, if it is determined that the communication link with the first external electronic device 311 has been disconnected, the electronic device 301 may determine a missing state based on at least one of a risk level, time, and/or location received from the first external electronic device 311.

For example, if the electronic device 301 is located at a specified location (e.g., reliable location) in a state in which the communication link is disconnected, the electronic device 301 may determine that the electronic device 301 is not in a missing state. In this case, the electronic device 301 may periodically transmit the first-type data in order to re-connect to the first external electronic device 311. The electronic device 301 may change a transmission period (e.g., first period), transmission channel, and/or transmission power of the first-type data and transmit the first-type data. For example, the electronic device 301 may increase the transmission period or decrease the transmission power in order to reduce battery consumption.

For example, if the electronic device 301 is not located at a specified location in a state in which the communication link is disconnected, the electronic device 301 may determine that the electronic device 301 is in a missing state. The electronic device 301 may determine whether the electronic device 301 is located at a specified location based on location information received from the first external electronic device 311.

For example, in a state in which the communication link is disconnected, the electronic device 301 may determine a missing state based on time information. The electronic device 301 may compare time information received from the first external electronic device 311 with current time. If a specified time has elapsed from the received time information, the electronic device 301 may determine that the electronic device 301 is in a missing state.

For example, in a state in which the communication link is disconnected, the electronic device 301 may determine a missing state based on time information and location information. For example, if the location information indicates a specified location, the electronic device 301 may determine that the electronic device 301 is in a missing state after elapse of a first time from the time information. If the location information does not correspond to a specified location, the electronic device 301 may determine that the electronic device 301 is in a missing state after elapse of a second time (e.g., time shorter than the first time) from the time information.

For example, in a state in which the communication link is disconnected, the electronic device 301 may determine a missing state based on a risk level. For example, if the risk level exceeds a specified value and the communication link is disconnected, the electronic device 301 may determine that the electronic device 301 is in a missing state. The electronic device 301 may determine the risk level based on location information and time information. For example, the electronic device 301 may increase the risk level when the electronic device 301 is not located at a specified location. The electronic device 301 may increase the risk level as time elapses from time information recently received from the first external electronic device 311. If the risk level exceeds a specified risk level, the electronic device 301 may determine that the electronic device 301 is in a missing state.

If the state of the electronic device 301 is determined as a missing state, the electronic device 301 may attempt to restore the communication link with the first external electronic device 311. For example, the electronic device 301 may attempt to restore the communication link with the first external electronic device 311 by performing advertising at a different period from the first period. For example, the electronic device 301 may transmit the first-type data at a period shorter than the first period in a missing state.

If the state of the electronic device 301 is determined as a missing state, the electronic device 301 may attempt to transmit information about a missing state of the electronic device 301. For example, as described below in relation to FIGS. 8 to 10, the electronic device 301 may search for a nearby electronic device by transmitting second-type data. The electronic device 301 may transmit a missing state of the electronic device 301 to the server 221 using a reliable electronic device among nearby electronic devices.

Figure 8:
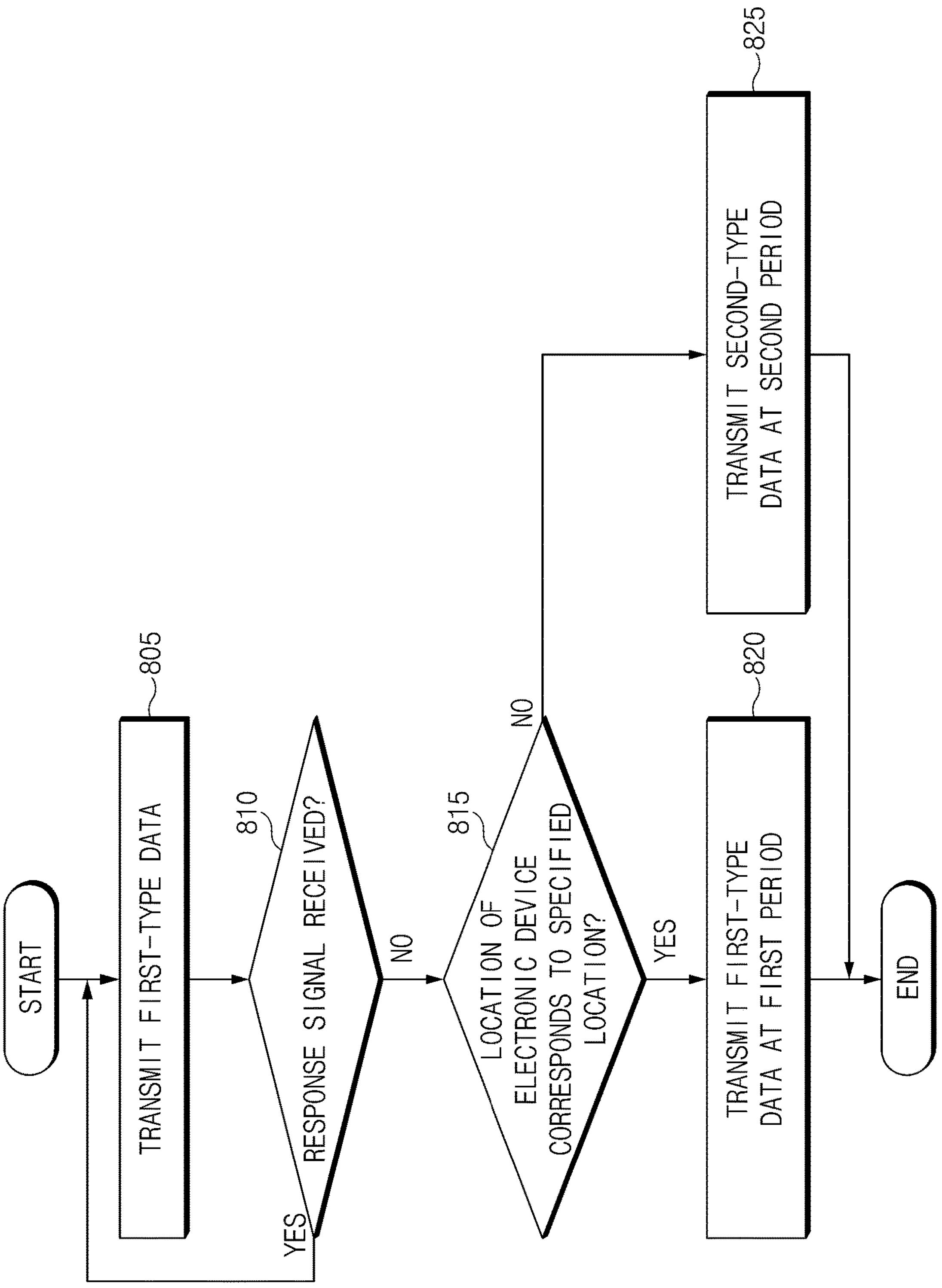
FIG. 8 is an exemplary flowchart illustrating a data transmitting method of an electronic device according to an embodiment.

FIG. 8 is a flowchart illustrating a data transmitting method of an electronic device according to an embodiment.

In operation 805, the electronic device 301 may transmit first-type data. For example, transmission of the first-type data may correspond to operations 401, 403, and 405 of FIG. 4 or operations 705, 715, 725, 730, and 735 of FIG. 7.

In operation 810, the electronic device 301 may determine whether a response signal is received from the first external electronic device 311. For example, if the response signal is not received within a specified time after transmitting the first-type data, the electronic device 301 may determine that the response signal is not received. If the response signal is received (e.g., operation 810—Yes), the electronic device 301 may transmit the first-type data at a specified first period.

If the response signal is not received (e.g., operation 810—No), the electronic device 301 may determine whether a location of the electronic device 301 corresponds to a specified location (e.g., reliable location) in operation 815. The electronic device 301 may determine whether the location of the electronic device 301 corresponds to the specified location using location information stored in a memory. For example, the electronic device 301 may receive location information from the first external electronic device 311. The electronic device 301 may determine whether the electronic device 301 corresponds to the specified location using location information most recently received before non-reception of the response signal from the first external electronic device 311. In FIG. 8, operation 815 may be referred to as an operation of determining whether the electronic device 301 is in a missing state. For example, as described above in relation to FIG. 7, the electronic device 301 may determine whether the electronic device 301 is in a missing state based on location information, time information, and/or a risk level. For example, the electronic device 301 may be configured to perform operation 825 if it is in a missing state and perform operation 820 if it is not in a missing state.

If the location of the electronic device 301 corresponds to the specified location (e.g., operation 815—Yes), the electronic device 301 may transmit the first-type data at a period longer than the first period in operation 820. The electronic device 301 may attempt to re-connect to the electronic device 301 by transmitting the first-type data.

If the location of the electronic device 301 does not correspond to the specified location (e.g., operation 815—No), the electronic device 301 may transmit the second-type data in operation 825. The electronic device 301 may broadcast information of the electronic device 301 to nearby devices by transmitting the second-type data. Hereinafter, transmission of the second-type data will be described in more detail with reference to FIGS. 9 and 10.

Figure 9:
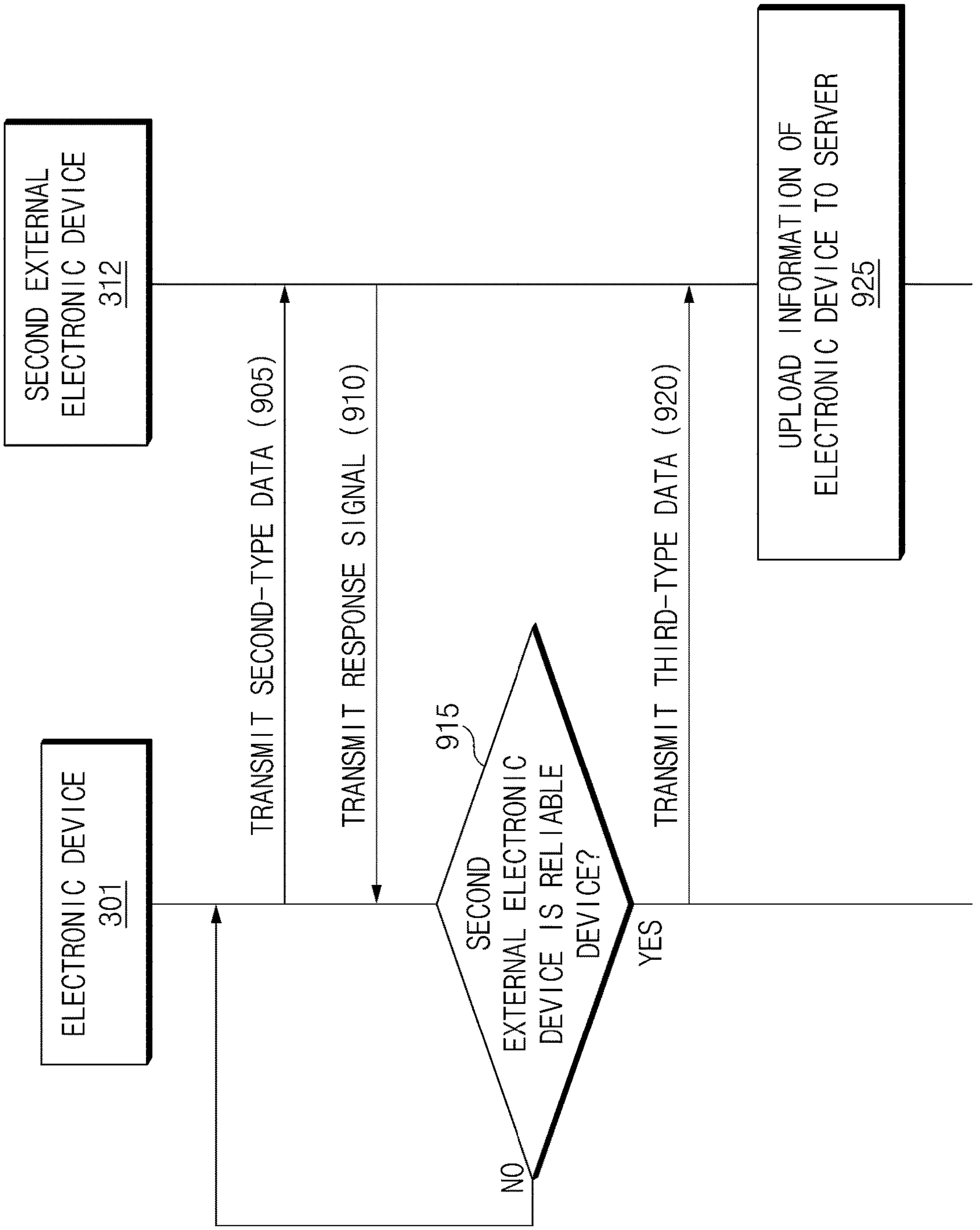
FIG. 9 illustrates an exemplary signal flow diagram of communication between an electronic device and a second external electronic device according to an embodiment.

FIG. 9 illustrates a signal flow diagram of communication between an electronic device and a second external electronic device according to an embodiment.

According to an embodiment, the electronic device 301 may transmit second-type data if the electronic device 301 is in a missing state. In operation 905, the electronic device 301 may transmit the second-type data. For example, the electronic device 301 may broadcast (e.g., advertise) a signal including the second-type data. The second-type data may be received by nearby devices, and may be a signal for requesting a response of the nearby devices. For example, the second-type data may include ADV_IND PDU. ADV_IND PDU may include address information of the electronic device 301. ADV_IND PDU may further include data including information of the electronic device 301. The electronic device 301 may allow nearby devices to receive the second-type data by setting ADV_IND PDU to a scannable type. For example, a payload of ADV_IND PDU may include the AdvA field described above in relation to FIG. 6 and the field of AdvData 524 of FIG. 5.

The electronic device 301 may transmit the second-type data at a second period. The second period may have a different length from that of the first period for transmitting the first-type data. The electronic device 301 may set the second period based on location information, time information, and risk level of the electronic device 301. The second period may be a specified value.

The electronic device 301 may change a transmission channel (e.g., ADV channel) of the second-type data. For example, the electronic device 301 may select an ADV channel by performing a Modulo 3 operation using an arbitrary value (e.g., value associated with a current time), and may transmit the second-type data through the selected ADV channel.

The electronic device 301 may change transmission power of the second-type data. For example, the electronic device 301 may change the transmission power based on the location information. For example, the electronic device 301 may use different transmission power according to the location information.

The electronic device 301 may prevent the electronic device 301 from being searched for by too many nearby devices by changing a transmission period, channel, and/or transmission power of the second-type data. The electronic device 301 may reduce power consumption of nearby devices by reducing the number of nearby devices that may search for. A parameter (e.g., transmission period, channel, and/or transmission power) associated with transmission of the second-type data of the electronic device 301 is stored in a memory of the electronic device 301, and may be received from the first external electronic device 311.

In operation 910, the second external electronic device 312 that has received the second-type data of the electronic device 301 may transmit a response signal to the electronic device 301. Although not illustrated in FIG. 9, the electronic device 301 may receive the response signal from a plurality of nearby devices including the second external electronic device 312. For example, the response signal may be a scan request.

In operation 915, the electronic device 301 may determine whether the second external electronic device 312 that has transmitted the response signal is a reliable device. For example, if the second external electronic device 312 is found for at least a specified time, the electronic device 301 may determine the second external electronic device 312 as a reliable device. The electronic device 301 may periodically transmit the second-type data, and, if at least a specified number of response signals are received from the second external electronic device 312, the electronic device 301 may determine the second external electronic device 312 as a reliable device. For example, if the response signal having at least specified reception strength is received at least a specified number of times from the second external electronic device 312, the electronic device 301 may determine the second external electronic device 312 as a reliable device. If the second external electronic device 312 is not a reliable device (e.g., operation 915—No), the electronic device 301 may continue to transmit the second-type data so as to search for a reliable device.

If the second external electronic device 312 is a reliable device (e.g., operation 915—Yes), the electronic device 301 may transmit third-type data to the second external electronic device 312 in operation 920. For example, the electronic device 301 may transmit a signal (e.g., scan response) including the third-type data in response to reception of the response signal (e.g., scan request). The electronic device 301 may transmit the third-type data using an ADV packet. The electronic device 301 may allow the second external electronic device 312 among nearby devices to receive the third-type data by including an address of the second external electronic device 312 in the third-type data and broadcasting (e.g., advertising) the same. The third-type data may include information about a missing state of the electronic device 301 (e.g., information indicating a missing state, identification information of the electronic device 301, information about the owner of the electronic device 301, battery information of the electronic device 301, time information, location information, and/or time information).

Although not illustrated in FIG. 9, the electronic device 301 may transmit, to the second external electronic device 312, a signal for notifying that the third-type data will be transmitted, before transmitting the third-type data.

FIG. 10 illustrates a table 1000 showing a payload format field of extended advertising of ADV_EXT_IND PDU. The above descriptions related to table 600 of FIG. 6 may be referenced for descriptions of the fields and corresponding values shown in table 1000. Referring to table 1000 of FIG. 10, the electronic device 301 may notify the second external electronic device 312 that transmission of the third-type data will be followed by generating ADV_EXT_IND PDU of a Scannable Directed type and transmitting (e.g., advertising) the generated ADV_EXT_IND PDU to the second external electronic device 312.

Referring to table 600 of FIG. 6, for example, the third-type data may include AUX_ADV_IND PDU. The electronic device 301 may generate AUX_ADV_IND PDU of a Non-Connectable and Non-Scannable Directed type or Connectable Directed type, and may include information about a missing state of the electronic device 301 in an AdvData field (e.g., the AdvData 524 of FIG. 5).

Referring back to FIG. 9, the second external electronic device 312 may upload information of the electronic device 301 to the server 221 in operation 925. For example, the second external electronic device 312 may upload at least a portion of the received information about a missing state of the electronic device 301 to the server 221. The second external electronic device 312 may upload location information of the second external electronic device 312 to the server 221 together with the information of the electronic device 301. As described above in relation to FIGS. 2 and 3, the server 221 may identify the first external electronic device 311 associated with the electronic device 301 using the received information of the electronic device 301. The server 221 may transmit, to the first external electronic device 311, location information of the electronic device 301 which is based on the location information of the second external electronic device 312. For example, the server 221 may set the location information of the electronic device 301 as the location information of the second external electronic device 312. The server 221 may notify the first external electronic device 311 of a current location of the electronic device 301 by transmitting the identification information of the electronic device 301 and the location information of the electronic device 301 to the first external electronic device 311. The first external electronic device 311 may provide a user with a notification including the received location information of the electronic device 301. The second external electronic device 312 may delete the information of the electronic device 301 after uploading the information of the electronic device 301.

Before performing operation 925, the second external electronic device 312 may determine whether the electronic device 301 is in a missing state. For example, location information included in the third-type data of the electronic device 301 may include location information most lately received by the electronic device 301 from the first external electronic device 311. The second external electronic device 312 may determine a missing state of the electronic device 301 by comparing the location information of the second external electronic device 312 with the location information received from the electronic device 301. If the received location information does not correspond to the location of the second external electronic device 312, the second external electronic device 312 may determine that the electronic device 301 is in a missing state. The second external electronic device 312 may perform operation 925 if the electronic device 301 is in a missing state.

If the electronic device 301 receives a signal from the first external electronic device 311, the electronic device 301 may restore communication with the first external electronic device 311. If communication with the first external electronic device 311 is restored, the electronic device 301 may not perform the operations illustrated in FIG. 9. For example, the electronic device 301 may stop transmitting the second-type data.

Figure 11:
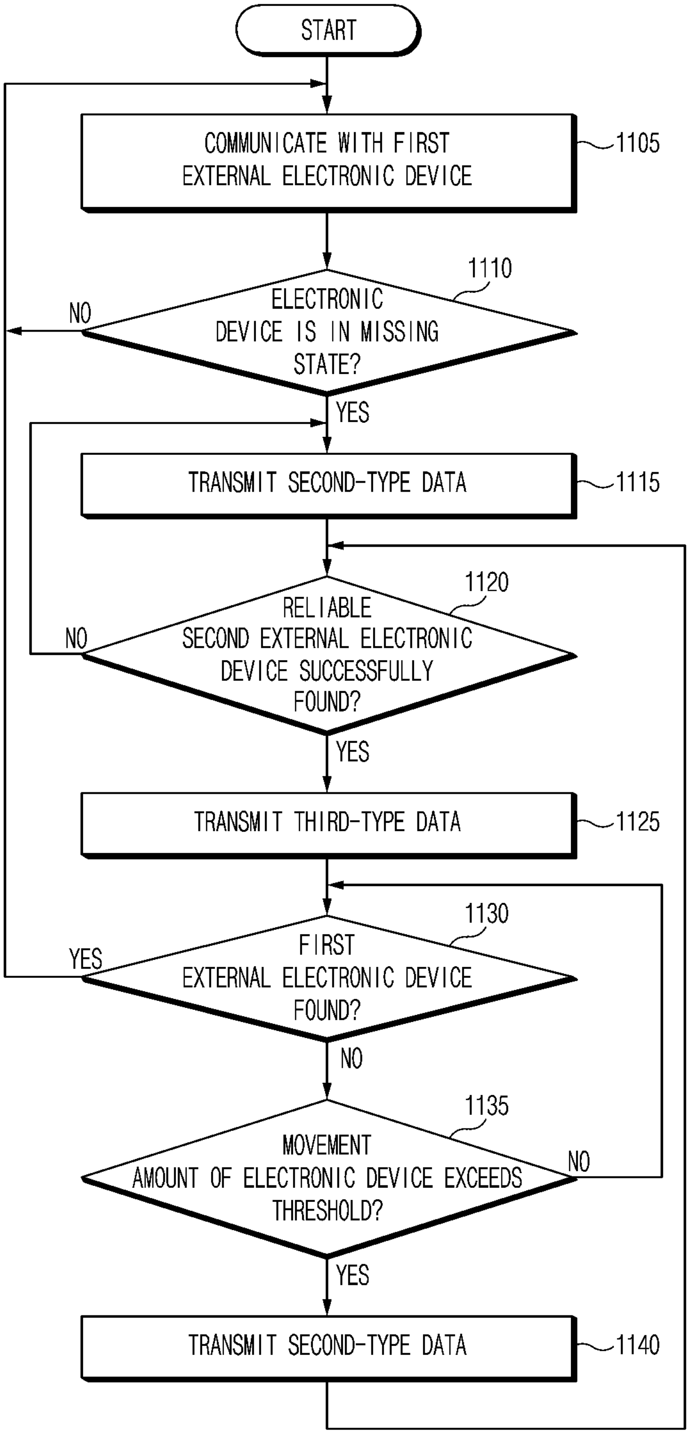
FIG. 11 is an exemplary flowchart illustrating a data transmitting method of an electronic device according to an embodiment.

FIG. 11 is a flowchart illustrating a data transmitting method of an electronic device according to an embodiment.

In operation 1105, the electronic device 301 may communicate with the first external electronic device 311. For example, the electronic device 301 may communicate with the first external electronic device 311 by performing operation 420 or operation 430 of FIG. 4.

In operation 1110, the electronic device 301 may determine whether the electronic device 301 is in a missing state. For example, as described above in relation to FIGS. 7 and 8, if communication with the first external electronic device 311 is disconnected, the electronic device 301 may determine a missing state of the electronic device 301 based on at least one of a location, time, and/or risk level. If the electronic device 301 is not in a missing state (e.g., operation 1110—No), the electronic device 301 may continue to communicate with the first external electronic device 311.

If the electronic device 301 is in a missing state (e.g., operation 1110—Yes), the electronic device 301 may transmit second-type data in operation 1115. For example, the electronic device 301 may transmit the second-type data by performing operation 825 of FIG. 8 or operation 905 of FIG. 9. The electronic device 301 may transmit the second-type data at a second period.

In operation 1120, the electronic device 301 may determine whether the reliable second external electronic device 312 has been successfully found (e.g., operation 915 of FIG. 9). For example, the electronic device 301 may search for the reliable second external electronic device 312 among nearby devices based on a response signal for the second-type data. If a search for a reliable external electronic device has failed (e.g., operation 1120—No), the electronic device 301 may continue to transmit the second-type data.

If the reliable second external electronic device 312 has been successfully found (e.g., operation 1120—Yes), the electronic device 301 may transmit third-type data (e.g., operation 920 of FIG. 9) in operation 1125. The electronic device 301 may transmit third-type data including information about a missing state of the electronic device 301 to the second external electronic device 312.

In operation 1130, the electronic device 301 may determine whether the first external electronic device 311 has been found. For example, the electronic device 301 may find the first external electronic device 311 by receiving a signal from the first external electronic device 311. If the first external electronic device 311 is found (e.g., operation 1130—Yes), the electronic device 301 may restore a communication link with the first external electronic device 311.

If the first external electronic device 311 has not been found (e.g., operation 1130—No), the electronic device 301 may determine whether a movement amount of the electronic device 301 exceeds a threshold in operation 1135. After transmitting the third-type data, the electronic device 301 may determine whether the movement amount of the electronic device 301 is within the threshold. For example, the electronic device 301 may obtain the movement amount of the electronic device 301 using a sensor circuit (e.g., the sensor circuit 350 of FIG. 3). If the movement amount of the electronic device 301 is equal to or less than the threshold, the electronic device 301 may continue to search for the first external electronic device 311.

If the movement amount of the electronic device 301 exceeds the threshold (e.g., operation 1135—Yes), the location of the second external electronic device 312 may not be adjacent to the location of the electronic device 301. In operation 1140, the electronic device 301 may transmit the second-type data. The electronic device 301 may re-attempt to search for a reliable electronic device by transmitting the second-type data. In operation 1140, the electronic device 301 may transmit the second-type data at a third period. For example, in operation 1115, the electronic device 301 may transmit the second-type data at the second period. The electronic device 301 may transmit the second-type data at the third period shorter than the second period in order to quickly upload the location information of the moved electronic device 301 to the server 221. Furthermore, in operation 1140, the electronic device 301 may change at least one of a transmission period, channel, and/or transmission power of the second-type data from operation 1115 in order to quickly search for nearby devices.

Figure 12:
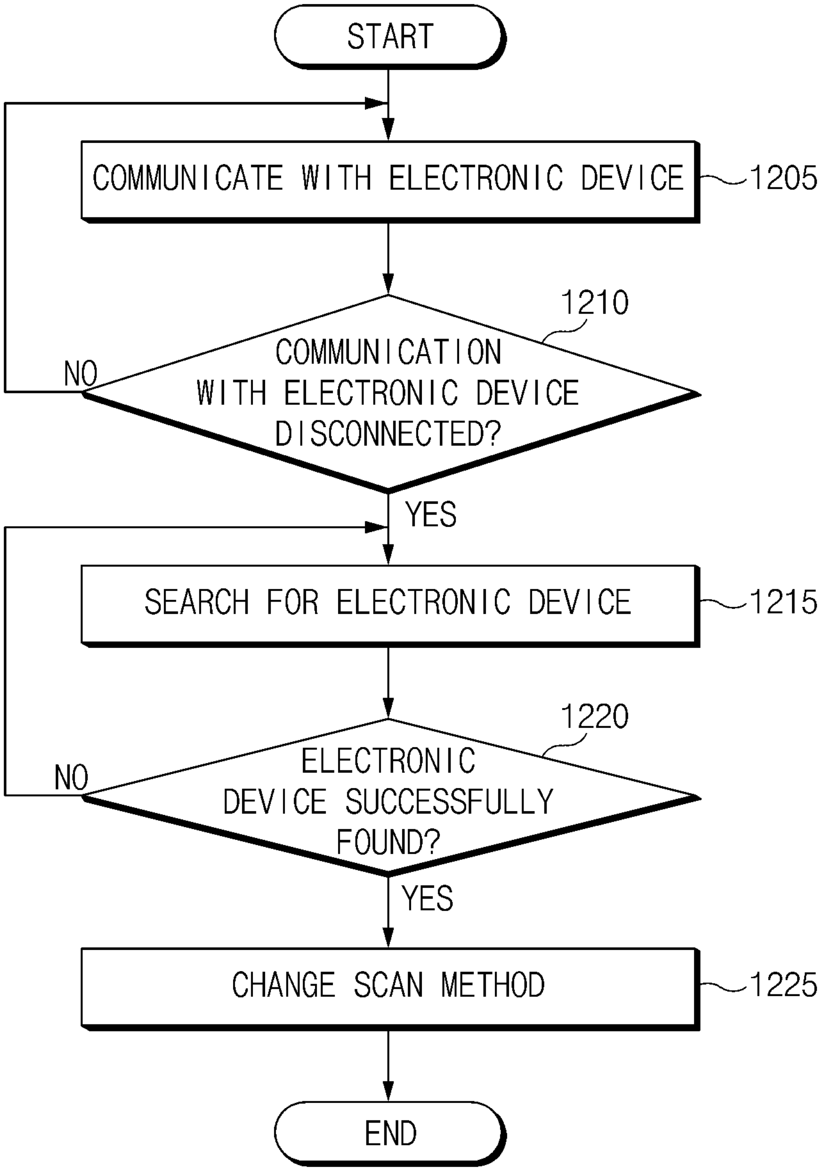
FIG. 12 is an exemplary flowchart illustrating an electronic device search method of a first external electronic device according to an embodiment.

FIG. 12 is a flowchart illustrating an electronic device search method of a first external electronic device according to an embodiment.

In operation 1205, the first external electronic device 311 may communicate with the electronic device 301. For example, the first external electronic device 311 may communicate with the electronic device 301 by performing operation 420 or operation 430 of FIG. 4.

In operation 1210, the first external electronic device 311 may determine whether communication with the electronic device 301 has been disconnected. For example, if a signal is not received from the electronic device 301 within a specified time, the first external electronic device 311 may determine that communication with the electronic device 301 has been disconnected. For example, if a signal is not received from the electronic device 301 within a specified time, the first external electronic device 311 may transmit a signal for finding the electronic device 301 and determine that communication with the electronic device 301 has been disconnected if a response signal is not received from the electronic device 301. If communication with the electronic device 301 is not disconnected (e.g., operation 1210—No), the first external electronic device 311 may continue to communicate with the electronic device 301.

If communication with the electronic device 301 is disconnected (e.g., operation 1210—Yes), the first external electronic device 311 may search for the electronic device 301 in operation 1215. For example, the first external electronic device 311 may perform scanning for receiving a signal from the electronic device 301. The first external electronic device 311 may reduce a scan period or increase a length of a scan window in order to increase a probability of detection of the electronic device 301.

In operation 1220, the first external electronic device 311 may determine whether the electronic device 301 has been successfully found. For example, if a signal is received from the electronic device 301, the first external electronic device 311 may determine that the electronic device 301 has been successfully found. If the electronic device 301 fails to be found (e.g., operation 1220—No), the first external electronic device 311 may continue to search for the electronic device 301.

If the electronic device 301 has been successfully found (e.g., operation 1220—Yes), the first external electronic device 311 may change a scan method in operation 1225. For example, the first external electronic device 311 may perform scanning using a scan period and/or scan window prior to operation 1215.

Figure 13:
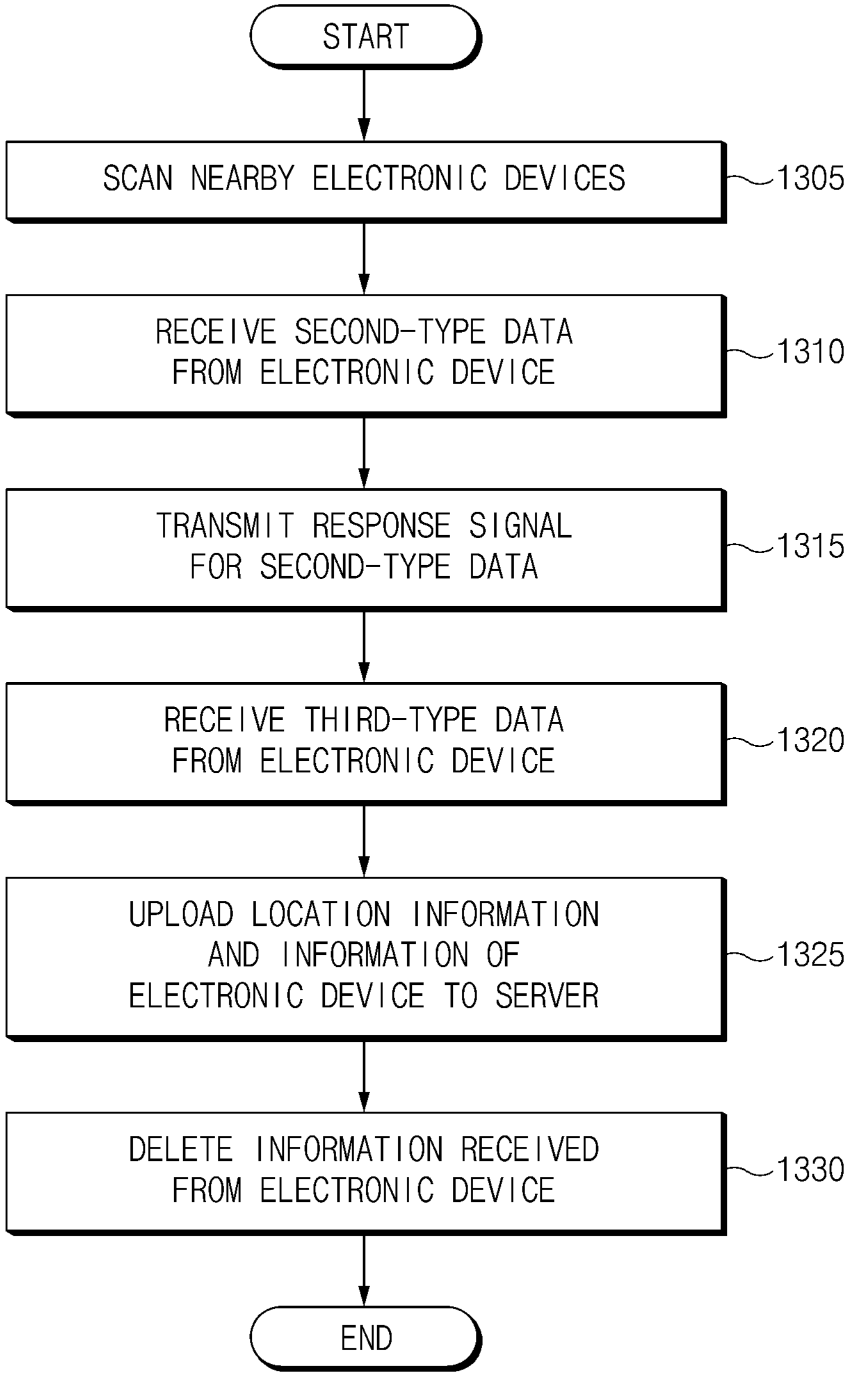
FIG. 13 is an exemplary flowchart illustrating an electronic device information upload method of a second external electronic device according to an embodiment.

FIG. 13 is a flowchart illustrating an electronic device information upload method of a second external electronic device according to an embodiment.

In operation 1305, the second external electronic device 312 may scan nearby electronic devices. For example, the second external electronic device 312 may be configured to perform active scanning.

In operation 1310, the second external electronic device 312 may receive second-type data from the electronic device 301 (e.g., operation 905 of FIG. 9). For example, the second external electronic device 312 may receive an advertisement including the second-type data.

In operation 1315, the second external electronic device 312 may transmit a response signal for the second-type data (e.g., operation 910 of FIG. 9). For example, the second external electronic device 312 may transmit a scan request in response to the second-type data.

In operation 1320, the second external electronic device 312 may receive third-type data from the electronic device 301 (e.g., operation 920 of FIG. 9). For example, the second external electronic device 312 may receive a scan response including the third-type data.

In operation 1325, the second external electronic device 312 may upload location information of the second external electronic device 312 and information of the electronic device 301 to the server 221. For example, the second external electronic device 312 may be a device configured to support a search for a missing device.

In operation 1330, the second external electronic device 312 may delete data (e.g., third-type data) received from the electronic device 301. For example, the second external electronic device 312 may delete the information of the electronic device 301 after elapse of a specified time after uploading the information of the electronic device 301 to the server 221.

Figure 14:
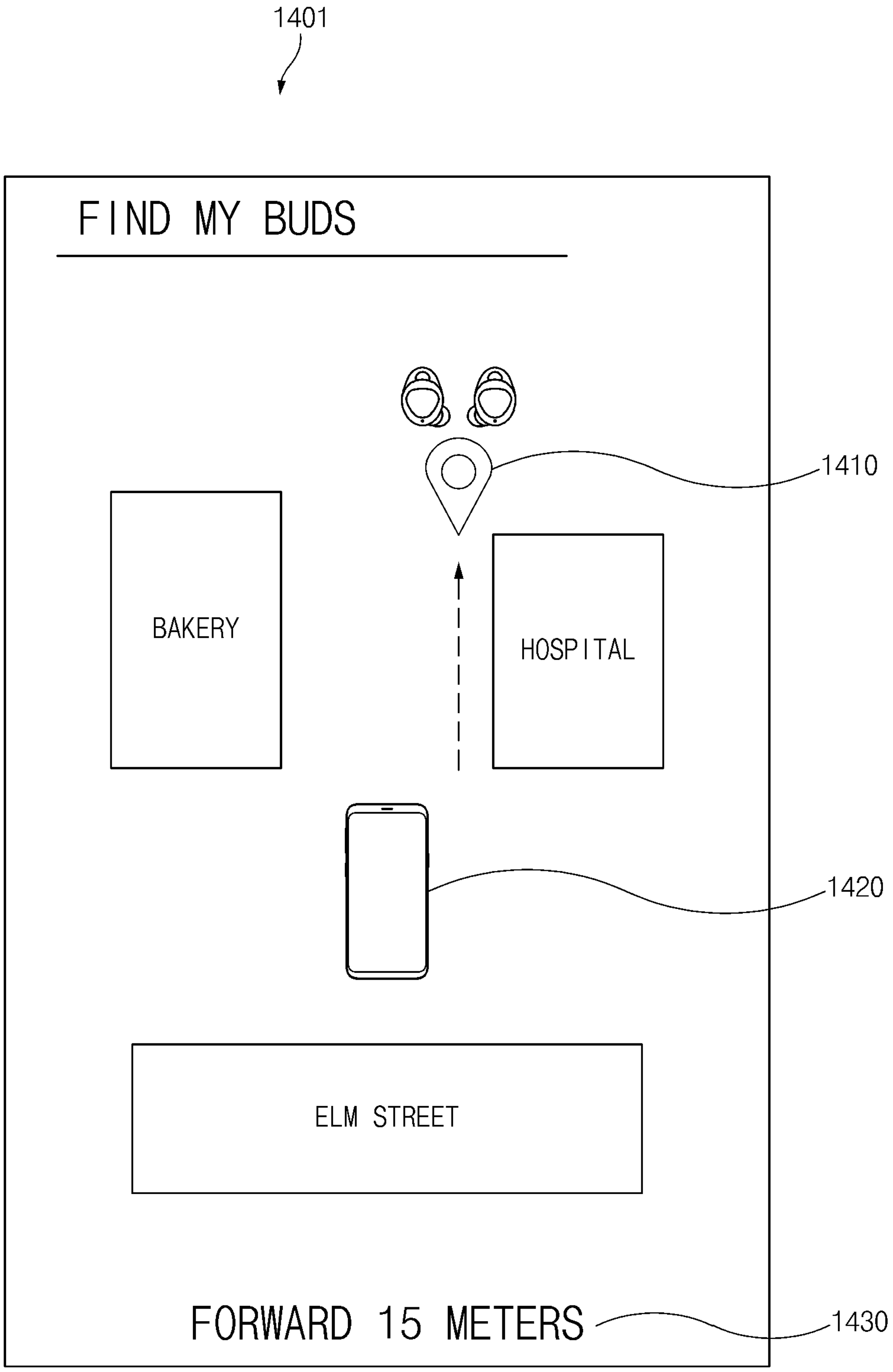
FIG. 14 illustrates an electronic device tracking user interface of a first external electronic device according to an embodiment.

FIG. 14 illustrates an electronic device tracking user interface of a first external electronic device according to an embodiment.

The server 221 may transfer, to the first external electronic device 311, information of the electronic device 301 and location information received from the second external electronic device 312. Upon reception of the information of the electronic device 301 that is in a missing state, the first external electronic device 311 may provide a user with a user interface indicating location information of the electronic device 301.

According to an embodiment, the first external electronic device 311 may display a user interface 1401. For example, the user interface 1401 may include a map. The first external electronic device 311 may display an indicator 1410 displaying the location of the electronic device 301 on the map. For example, the first external electronic device 311 may display guide information 1430 for guiding movement to the electronic device 301.

Figure 15:
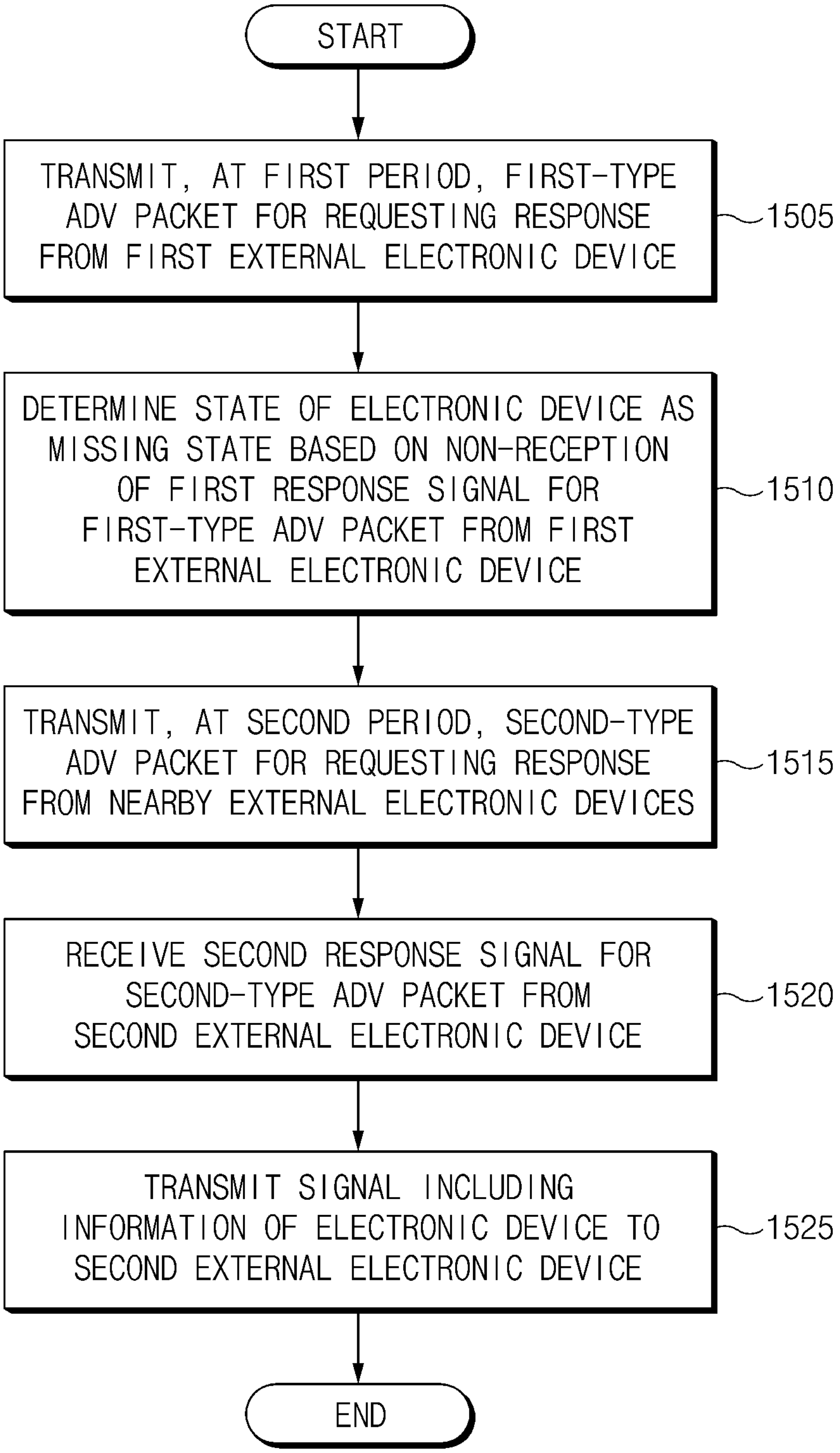
FIG. 15 is an exemplary flowchart illustrating a method for an electronic device to transmit data to a second external electronic device according to an embodiment.

FIG. 15 is a flowchart illustrating a method for an electronic device to transmit data to a second external electronic device according to an embodiment.

In operation 1505, the electronic device 301 may transmit (e.g., operation 1105 of FIG. 11), at a first period, a first-type ADV packet for requesting a response from the first external electronic device 311. For example, the first-type ADV packet may include address information of the first external electronic device 311. The first-type ADV packet may be directed to the first external electronic device 311.

In operation 1510, the electronic device 301 may determine the state of the electronic device 301 as a missing state (e.g., operation 1110 of FIG. 11) based on non-reception of a first response signal (e.g., scan request) for the first-type ADV packet from the first external electronic device 311. If the first response signal is not received for a specified time, the electronic device 301 may determine the state of the electronic device 301 based on location information. For example, if the location information stored in a memory corresponds to a specified location (e.g., reliable location), the electronic device 301 may determine that the electronic device 301 is not in a missing state. If the location information does not correspond to the specified location, the electronic device 301 may determine that the electronic device 301 is in a missing state. For example, the electronic device 301 may receive the location information and the specified location from the first external electronic device 311.

In operation 1515, the electronic device 301 may transmit (e.g., operation 1115 of FIG. 11), at a second period, a second-type ADV packet for requesting a response from nearby external electronic devices. The second-type ADV packet may be a non-directed scannable ADV packet. For example, if the electronic device 301 is determined to be in a missing state, the electronic device 301 may select at least one channel from among a first ADV channel, a second ADV channel, and a third ADV channel so as to transmit the second-type ADV packet. Transmission power may be adjusted in consideration of surrounding situations even when transferring the second-type ADV packet. The electronic device 301 may transmit the second-type ADV packet at first transmission power through the first ADV channel, the second-type ADV packet at second transmission power through the second ADV channel, and a third-type ADV packet at third transmission power through the third ADV channel. For example, a recipient of the second-type ADV packet may not be designated.

In operation 1520, the electronic device 301 may receive a second response signal (e.g., scan request) for the second-type ADV packet from the second external electronic device 312. For example, the electronic device 301 may receive a plurality of response signals for the second-type ADV packet from a plurality of nearby external electronic devices. The electronic device 301 may identify the second external electronic device 312 among the plurality of nearby external electronic devices based on reception strength of the second response signal and the number of times the second response signal is received among the plurality of response signals. For example, if the second response signal having at least specified reception strength is received at least a specified number of times, the electronic device 301 may identify the second external electronic device 312 among the plurality of external electronic devices. The electronic device 301 may identify the second external electronic device 312 as a reliable device.

In operation 1525, the electronic device 301 may transmit a signal including information of the electronic device 301 to the second external electronic device 312 (e.g., operation 1125 of FIG. 11). For example, the electronic device 301 may transmit a third-type ADV packet. For example, the information of the electronic device 301 may include at least one of identification information, battery status information, or location information of the electronic device 301. By transmitting the information of the electronic device 301 to the second external electronic device 312, the electronic device 301 may cause the second external electronic device 312 to transfer the location information of the second external electronic device 312 and the information of the electronic device 301 to the first external electronic device 311 via the server 221.

After transmitting the information of the electronic device 301 to the second external electronic device 312, the electronic device 301 may obtain motion information of the electronic device 301. If the obtained motion is at least a threshold, the electronic device 301 may search for nearby devices by transmitting the second-type ADV packet at a third period. For example, the electronic device 301 may search for a new reliable device.

The invention claimed is:

1. An electronic device comprising:

a wireless communication circuit configured to perform short-range wireless communication;

a processor; and a memory, wherein the memory stores instructions that, when executed by the processor, cause the electronic device to:

transmit, from the electronic device to a first external electronic device at a first period, a first-type advertisement (ADV) packet using the wireless communication circuit, wherein the first-type ADV packet is transmitted to request a response from the first external electronic device, determine, by the electronic device, that the electronic device is missing based on location information of the electronic device and based on the first electronic device not receiving a first response signal for the first-type ADV packet from the first external electronic device, transmit, by the electronic device to a nearby external electronic device, a second-type ADV packet at a second period using the wireless communication circuit based on determining that the electronic device is missing, wherein the second-type ADV is transmitted to request a response from the nearby external electronic device, receive, by the electronic device and from a plurality of nearby external electronic devices, a plurality of second response signals for the second-type ADV packet, identify, by the electronic device, a second external electronic device from among the plurality of nearby external electronic devices based on at least one of a reception strength, a number of reception times, or a reception duration for each of the plurality of second response signals, and transmit, by the electronic device to the second external electronic device, a signal including information of the electronic device and missing state information.

2. The electronic device of claim 1, wherein the instructions, when executed by the processor, further cause the electronic device to identify the second external electronic device among the plurality of nearby external electronic devices based on the second response signal having at least a specified reception strength being received at least a specified number of times or the second response signal having at least the specified reception strength being received for at least a predefined threshold time from the second external electronic device.

3. The electronic device of claim 1, wherein the instructions, when executed by the processor, further cause the electronic device to transmit, to the nearby external electronic device, the second-type ADV packet through at least one of a first ADV channel, a second ADV channel, or a third ADV channel using the wireless communication circuit, based on the electronic device determining that the electronic device is missing.

4. The electronic device of claim 3, wherein the instructions, when executed by the processor, further cause the electronic device to, if the electronic device is determined to be missing, select at least one channel from among the first ADV channel, the second ADV channel, or the third ADV channel based on a current time, and transmit the second-type ADV packet through the selected at least one channel, wherein a transmission power set for each of the first ADV channel, the second ADV channel, and the third ADV channel is different from each other.

5. The electronic device of claim 1, wherein the instructions, when executed by the processor, further cause the electronic device to determine that the electronic device is not missing if location information stored in the memory corresponds to a specified location, and determine that the electronic device is missing if the location information stored in the memory does not correspond to the specified location.

6. The electronic device of claim 5, wherein the instructions, when executed by the processor, further cause the electronic device to receive the location information and information about the specified location from the first external electronic device.

7. The electronic device of claim 1, wherein the instructions, when executed by the processor, further cause the electronic device to transmit, to the second external electronic device, missing information of the electronic device to allow the second external electronic device to transfer the missing information of the electronic device to the first external electronic device via an external server.

8. The electronic device of claim 1, further comprising a motion sensor, wherein the instructions, when executed by the processor, further cause the electronic device to:

obtain a motion of the electronic device using the motion sensor after transmitting the signal including the information of the electronic device, and search for nearby devices by transmitting the second-type ADV packet at a third period shorter than the second period if the obtained motion is at least a threshold.

9. The electronic device of claim 1, wherein the first-type ADV packet comprises address information of the first external electronic device, and a recipient of the second-type ADV packet is not designated.

10. A method for transmitting electronic device information in a missing state of an electronic device, the method comprising:

transmitting, from the electronic device to a first external electronic device, at a first period, a first-type advertisement (ADV) packet requesting a response from the first external electronic device;

determining, by the electronic device, that the electronic device is missing based on location information of the electronic device and based on the first electronic device not receiving a first response signal for the first-type ADV packet from the first external electronic device;

transmit, by the electronic device to a nearby external electronic device, at a second period, a second-type ADV packet based on determining that the electronic device is missing;

receiving, by the electronic device and from a plurality of nearby external electronic devices, a plurality of second response signals for the second-type ADV packet;

identifying, by the electronic device, a second external electronic device from among the plurality of nearby external electronic devices based on at least one of a reception strength, a number of reception times, or a reception duration for each of the plurality of second response signals; and transmitting, by the electronic device to the identified second external electronic device, a signal including information of the electronic device and missing state information.

11. The method of claim 10, wherein the identifying of the second external electronic device comprises:

identifying the second external electronic device among the plurality of nearby external electronic devices based on the second response signal having at least specified reception strength is received at least a specified number of times from the second external electronic device.

12. The method of claim 10, wherein the transmitting of the second-type ADV packet at the second period comprises:

sequentially transmitting, by the electronic device and to the nearby external electronic device, the second-type ADV packet through a first ADV channel, a second ADV channel, and a third ADV channel based on the electronic device being determined to be missing, wherein a transmission power associated with each of the first ADV channel, the second ADV channel, and the third ADV channel is differently set.

13. The method of claim 10, wherein determining that the electronic device is missing comprises:

determining that the electronic device is not missing state if location information stored in a memory of the electronic device corresponds to a specified location; and determining that the electronic device is missing if the location information stored in the memory does not correspond to the specified location.

14. The method of claim 10, wherein transmitting the signal including information of the electronic device to the second electronic device comprises allowing the second external electronic device to transfer the missing information of the electronic device to the first external electronic device via an external server.

15. A non-transitory computer readable medium storing instructions that, when executed by at least one processor, cause the at least one processor to:

transmit, from the electronic device to a first external electronic device at a first period, a first-type advertisement (ADV) packet using the wireless communication circuit, wherein the first-type ADV packet is transmitted to request a response from the first external electronic device;

determine, by the electronic device, that the electronic device is missing based on location information of the electronic device and based on the first electronic device not receiving a first response signal for the first-type ADV packet from the first external electronic device;

transmit, by the electronic device to a nearby external electronic device, a second-type ADV packet at a second period using the wireless communication circuit based on determining that the electronic device is missing, wherein the second-type ADV is transmitted to request a response from the nearby external electronic device;

receive, by the electronic device and from a plurality of nearby external electronic devices, a plurality of second response signals for the second-type ADV packet;

identify, by the electronic device, a second external electronic device from among the plurality of nearby external electronic devices based on at least one of a reception strength, a number of reception times, or a reception duration for each of the plurality of second response signals; and transmit, by the electronic device to the second external electronic device, a signal including information of the electronic device and missing state information.

16. The non-transitory computer readable medium of claim 15, wherein the instructions further cause the at least one processor to identify the second external electronic device among the plurality of nearby external electronic devices based on the second response signal having at least a specified reception strength being received at least a specified number of times or the second response signal having at least the specified reception strength being received for at least a predefined threshold time from the second external electronic device.

17. The non-transitory computer readable medium of claim 15, wherein the instructions further cause the at least one processor to transmit, to the nearby external electronic device, the second-type ADV packet through at least one of a first ADV channel, a second ADV channel, or a third ADV channel using the wireless communication circuit, based on the electronic device determining that the electronic device is missing.

* * * * *